(12) United States Patent
Ogawa

(10) Patent No.: US 11,206,266 B2
(45) Date of Patent: Dec. 21, 2021

(54) TRANSACTION SYSTEM, TRANSACTION METHOD, AND INFORMATION RECORDING MEDIUM

(71) Applicant: Passlogy Co., Ltd., Tokyo (JP)

(72) Inventor: Hideharu Ogawa, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 75 days.

(21) Appl. No.: 15/316,043

(22) PCT Filed: Jan. 21, 2015

(86) PCT No.: PCT/JP2015/051525
§ 371 (c)(1),
(2) Date: Dec. 2, 2016

(87) PCT Pub. No.: WO2015/186372
PCT Pub. Date: Dec. 10, 2015

(65) Prior Publication Data
US 2017/0126690 A1    May 4, 2017

(30) Foreign Application Priority Data
Jun. 3, 2014  (WO) .................. PCT/JP2014/064757

(51) Int. Cl.
*G06F 21/43* (2013.01)
*G06F 21/31* (2013.01)
*H04L 29/06* (2006.01)

(52) U.S. Cl.
CPC ............ *H04L 63/102* (2013.01); *G06F 21/31* (2013.01); *G06F 21/43* (2013.01); *H04L 63/0853* (2013.01); *H04L 63/126* (2013.01); *H04L 63/18* (2013.01)

(58) Field of Classification Search
CPC ..... G06F 21/31; G06F 21/43; H04L 63/0853; H04L 63/102; H04L 63/126; H04L 63/18
See application file for complete search history.

(56) References Cited

U.S. PATENT DOCUMENTS

| | | | | |
|---|---|---|---|---|
| 4,958,066 A * | 9/1990 | Hedgcoth | ............ | G06Q 20/347 235/487 |
| 5,914,472 A | 6/1999 | Foladare et al. | | |
| 6,829,711 B1 * | 12/2004 | Kwok | .................. | G06Q 20/341 713/183 |
| 7,021,534 B1 | 4/2006 | Kiliccote | | |
| 8,739,260 B1 * | 5/2014 | Damm-Goossens | ........................ | H04W 12/065 726/7 |
| 9,230,087 B2 * | 1/2016 | Oksman | .................. | G06F 21/36 |
| 2008/0086759 A1 * | 4/2008 | Colson | .................. | G06Q 30/06 726/2 |
| 2008/0288384 A1 * | 11/2008 | Collins | .................. | G06Q 20/24 705/35 |
| 2009/0047928 A1 * | 2/2009 | Utsch | .................. | G06Q 20/3223 455/410 |
| 2010/0312645 A1 * | 12/2010 | Niejadlik | ........... | G06Q 30/0257 705/14.55 |
| 2011/0213711 A1 * | 9/2011 | Skinner | .................... | G06F 21/43 705/71 |
| 2013/0160098 A1 * | 6/2013 | Carlson | ............... | H04L 63/0876 726/6 |
| 2013/0166449 A1 * | 6/2013 | Moon | .................. | G06Q 20/405 705/44 |
| 2013/0179336 A1 * | 7/2013 | Lyons | ................ | G06Q 20/3276 705/39 |
| 2014/0223185 A1 * | 8/2014 | Bender | ................. | H04L 9/3247 713/176 |
| 2015/0254659 A1 * | 9/2015 | Kulkarni | ................ | A61L 31/145 705/71 |
| 2016/0134424 A1 * | 5/2016 | Forget | ..................... | G06F 21/42 713/176 |

FOREIGN PATENT DOCUMENTS

| | | |
|---|---|---|
| JP | 2001-188759 A | 10/2001 |
| JP | 2004509409 A | 3/2004 |
| JP | 2005050092 A | 2/2005 |
| JP | 2007026039 | 2/2007 |
| JP | 2007034727 A | 2/2007 |
| JP | 2007-249726 | 9/2007 |
| JP | 2008-269054 A | 5/2008 |
| JP | 2008152639 A | 7/2008 |
| JP | 2008-197710 | 8/2008 |
| JP | 2008-197939 A | 8/2008 |
| JP | 2011204169 A | 10/2011 |

(Continued)

OTHER PUBLICATIONS

Alfred J. Menezes, Jonathan Katz, Paul C. van Oorschot, Scott A. Vanstone; Handbook of Applied Cryptography, 1996, CRC Press, 1st Ed., p. 11-13.*

(Continued)

*Primary Examiner* — Daniel B Potratz
*Assistant Examiner* — D'Arcy Winston Straub
(74) *Attorney, Agent, or Firm* — K&L Gates LLP; Louis C. Cullman; Hal Gibson

(57) ABSTRACT

The safety is improved when executing a transaction instructed after the login from a user having carried out the login operation to the server. A transaction system (101) includes a server (121), a first terminal (141), and a second terminal (161). A user logs-in the server (121) through the first terminal (141). The server (121) generates a notice to be transmitted to the second terminal (161) when receiving an instruction of a transaction through the first terminal (141) from a user. The first terminal (141) or the second terminal (161) prompts the user to input a confirmation of details of the transaction when the notice is transmitted to the second terminal (161) from the server (121). The server (121) regards the confirmation of the transaction made by the user as having been made when the input of the user matches with the details of the transaction.

14 Claims, 18 Drawing Sheets

(56) References Cited

FOREIGN PATENT DOCUMENTS

JP 2013196222 A 9/2013
WO 2010066304 A1 6/2010

OTHER PUBLICATIONS

Alzomai, M. et al., Display Security for Online Transactions: SMS-Based Authentication Scheme, Nov. 2010, 2010 International Conference for Internet Technology and Secured Transactions (Year: 2010).*
Menzes, A. et al.; Handbook of Applied Cryptography, 1996, CRC Press , 1st Ed., p. 11-13 (Year: 1996).*
Sakurai, Shoji, "Improvement of Transaction Authentication and Usability," IPSJ SIG Technical Reports, Feb. 26, 2009, vol. 2009, No. 20, pp. 217-222.
Sakurai et al., "Input Method of Sensitive Information Online," IPSJ SIG Technical Reports Heisei 21 nendo 6, May 6, 2010, pp. 1-6.
Hideaki Kawabata et al., Proposal of Fine-grained Access Control Framework in Android APIs, Computer Security Symposium (Oct. 19-21, 2011).
Notification of Reasons for Rejection of Japanese Patent Application No. 2015-100634 dated Aug. 13, 2018.
Notification of Reasons for Rejection in corresponding Japanese Patent Application Serial No. 2015-100634 dated Jun. 25, 2019 [original, and English translation enclosed].
Japanese Office Action for Japanese Patent Application No. 2014-253620 dated Jan. 30, 2018 (original and translation included).

* cited by examiner

TRANSACTION SYSTEM, TRANSACTION METHOD, AND INFORMATION RECORDING MEDIUM

TECHNICAL FIELD

The present disclosure relates to a transaction system that can improve the safety of a transaction by using a second terminal in the transaction system in which the login is carried out to a server through a first terminal, and a transaction instructed through the first terminal is executed, a transaction method by the transaction system, and a non-transitory information recording medium that records a program to realize the transaction system by a computer.

BACKGROUND ART

Conventionally, a transaction system is proposed in which a first authentication is required for the login to the server and a second authentication is required for execution of a transaction instructed after the login. For example, in the Internet banking, when a server is accessed through access terminals such as a computer and a smart phone via the Internet, a system is used generally in which the login is carried out by using a user name and the first password (first authentication), and after the login, a balance inquiry, and a transaction record inquiry can be carried out without any special authentication, but a second password is required (second authentication) in case of in-group transfer, transfer, application of new fixed term deposit, and the like.

A password predetermined by a user can be used in the first authentication and the second authentication. Also, a method is known in which a server instructs the position of a cell to be extracted to a user from a table of random numbers which was previously delivered to the user, and the user specifies the position of the cell and mathematics. Also, a system is proposed in which when the first authentication succeeds after the first authentication is carried out through the access terminal, the server transmits a one-time transaction password to a mobile phone, and in the second authentication, this transaction password is inputted to the access terminal to make it transfer to the server (Patent Literature 1, see paragraph [0033]).

CITATION LIST

Patent Literature

Patent Literature 1: National Patent Publication No. 2004-509409

SUMMARY OF INVENTION

Technical Problem

Recently, attacks occur in which a computer virus parasitic in a browser running in the access terminal monitors exchanges of a user and a server, and for example, money is unjustly acquired by rewriting content of transaction such as a transfer destination and a transfer remittance. Such an attack is called MITB (Man In The Browser) attack.

Because the MITB attack can be achieved only by rewriting the transaction content exchanged between the server and the access terminal so as not to be possible to see from the user, it is difficult to prevent this attack by merely combining the first authentication and the second authentication. Therefore, a technique to prevent such an attack effectively is demanded.

The present disclosure is made to solve the above-mentioned problem, and has, as an object, to provide a transaction system that can improve the safety of transaction by using a second terminal in the transaction system in which the login is carried out to a server through a first terminal, and a transaction instructed through the first terminal is executed, a transaction method by the transaction system, and a non-transitory information recording medium which records a program to realize the transaction system by a computer.

Solution to Problem

A transaction system according to the present disclosure includes a server, a first terminal, and a second terminal. When receiving an instruction of a transaction through the first terminal from a user having logged in the server through the first terminal, the server generates a notice to be transmitted to the second terminal. When the notice is transmitted to the second terminal from the server, the first terminal or the second terminal prompts the user to input a confirmation of details of the transaction. When the input of the user to the first terminal or the second terminal and the details of the transaction match with each other, the server regards the confirmation of the transaction made by the user as having been made.

Advantageous Effects of Disclosure

According to the present disclosure, in the transaction system, in which login is carried out to the server through the first terminal and a transaction instructed after the login is executed, a transaction system which improves a safety by using the second terminal, a transaction method by the transaction system, and a non-transitory information recording medium which records a program to realize the transaction system by a computer can be provided.

DESCRIPTION OF EMBODIMENTS

The foregoing describes some example embodiments for explanatory purposes. Although the foregoing discussion has presented specific embodiments, a person skilled in the art would recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Embodiment 1

Figure 1:
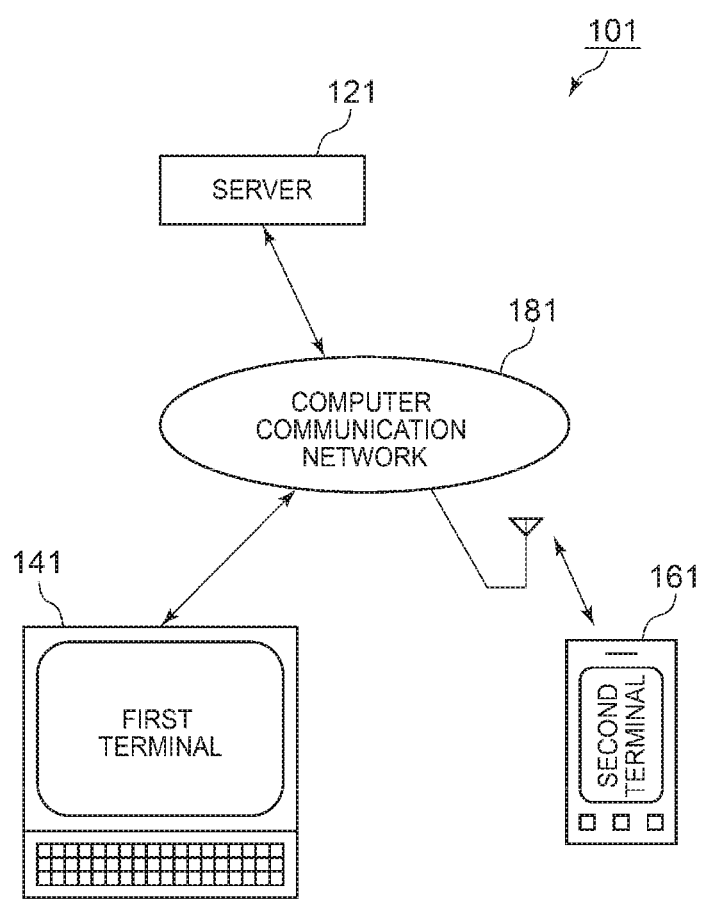
FIG. 1 is a diagram showing the overview of a transaction system according to an embodiment of the present disclosure.

FIG. 1 is a diagram showing the overview of the transaction system according to an embodiment of the present disclosure. Hereinafter, referring to FIG. 1, the transaction system will be described.

The transaction system 101 according to the present embodiment includes a server 121, a first terminal 141 and a second terminal 161.

The server 121 provides services of Internet banking and the like.

The first terminal 141 is connected with the server 121 through a computer communication network 181 to be communicable, and is used by a user to access the server 121. The user logs in to the server 121 through the first terminal 141 by a first authentication. Typically, a personal computer is adopted as the first terminal 141, but a mobile terminal such as a smart phone may be used. In the former case, the first terminal 141 and the server 121 are connected through an optical fiber cable which is provided by the Internet connection provider and the like.

The second terminal 161 is connected with the server 121 through the computer communication network 181 to be communicable, and is used by the user to confirm the transaction content that the user who has logged in to the server 121 has instructed the server 121 through the first terminal 141. Typically, the mobile terminal such as the smart phone is adopted as the second terminal 161, but a personal computer and the like may be used. In the former case, the second terminal 161 and the server 121 are connected through a mobile phone communication network using radio transmitters and the like.

In the present embodiment, it is not necessary that the first terminal 141 and the second terminal 161 can communicate mutually. That is, the communication network for the communication between the first terminal 141 and the server 121 and the communication network between the second terminal 161 and the server 121 typically pass through different communication paths, as mentioned above. However, because it is assumed that the user places the first terminal 141 and the second terminal 161 on his hand to use them at the same time, both of the first terminal 141 and the second terminal 161 can carry out intercommunication by a wireless LAN, Bluetooth (registered trademark) and the like, and can communicate with the server 121 through a common gateway.

Besides, different terminals are generally used as the first terminal 141 and the second terminal 161 but the same terminal may be used depending on the application.

Figure 2:
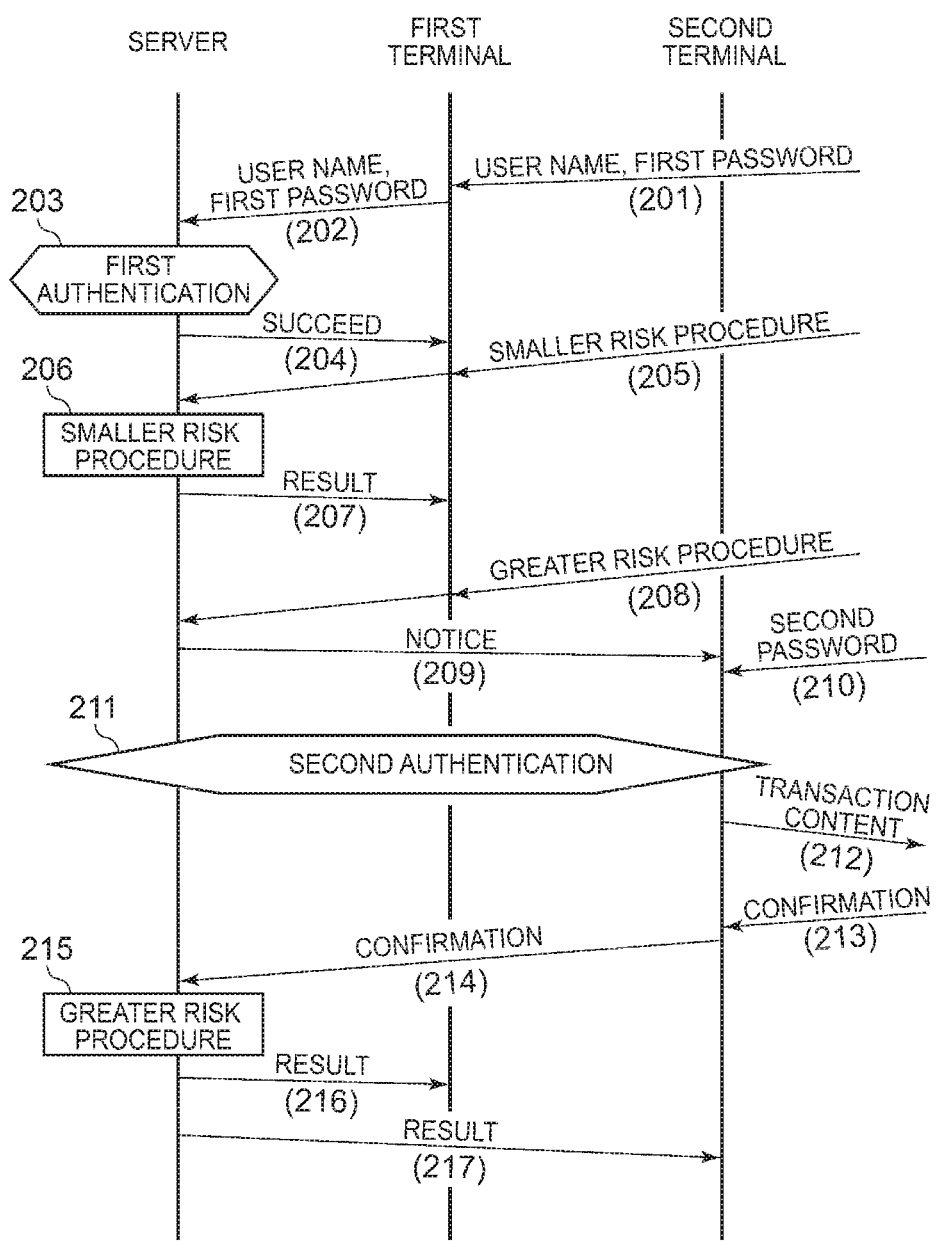
FIG. 2 is a diagram showing a way to exchange information in the transaction system according to an embodiment of the present disclosure.

FIG. 2 is a diagram showing the state of exchange of information in the transaction system according to an embodiment of the present disclosure. Hereinafter, referring to this diagram, an embodiment will be described. Furthermore, it is assumed in this description that a user name and a first password are used for the first authentication and a second password is used for the second authentication. Other situations will be described later.

As shown in FIG. 2, at first, when the user inputs the user name and the first password to the first terminal 141 from the second terminal (201), the first terminal 141 sends the user name and the first password to the server 121 (202). When the first authentication to the user name and the first password succeeds in the server 121 (203), the result is sent from the server 121 to the first terminal 141.

After this, when the user instructs a smaller risk procedure having a relatively smaller risk such as a balance inquiry and a deposit and withdrawal history inquiry through the first terminal 141 (205), the smaller risk procedure is carried out by the server 121 (206), and the result is sent from the server 121 to the first terminal 141 (207).

On the other hand, when the user instructs a greater risk procedure (transaction) having a relatively greater risk through the first terminal 141, such as a change of a password or user registration information, in addition to the transaction such as a transfer, an in-group transfer, application of fixed term deposit, purchases of various financial products (208), a notice showing the content of greater risk procedure is transmitted from the server 121 to the second terminal 161 (209).

The transmission using SMS (Short Message Service) and email through a mobile phone communication network can be adopted for transmission of the notice from the server 121 to the second terminal 161, as well as a push notice can be adopted to an application running on the second terminal 161.

In addition, a method may be adopted in which the server 121 encodes the notice content to codes such as a ciphered character string, a one-dimensional code and a two-dimensional code, to display on the screen of the first terminal 141, the user captures the codes displayed on the screen by using a camera of the second terminal 161, and the second terminal 161 acquires the notice from the captured codes.

When the notice is transmitted from the server 121, the second terminal 161 requests the user to input the second password (210). When the second authentication to the second password succeeds through the cooperation of the second terminal 161 and the server (211), the second terminal 161 displays the transaction content specified by the notice on the screen of the second terminal 161 (212) to inform the user.

When the user carries out an input to the second terminal 161 to indicate the confirmation of the transaction content displayed on the screen of the second terminal 161 (213), the indication of confirmation is transmitted to the server 121 (214), and the server 121 performs a greater risk procedure (215) and transmits the result to the first terminal 141 (216).

Also, when the greater risk procedure is performed, the result is also transmitted to the second terminal 161 (217), to erase a display to portend the transaction content to the user and display the result of the executed transaction.

In the present embodiment, the second password inputted to the second terminal 161 by the user is transmitted to the server 121, which carries out the second authentication. In the conventional Internet banking, the first password and the second password are usually inputted from one access terminal. However, because in the present embodiment, the first password and the second password are inputted from different terminals, it is possible to minimize damage by the MITB attack, even if one of the terminals is supposed to have been invaded by a computer virus.

Furthermore, as the second password, a character string or a symbol string which is predetermined between the user and the server 121 may be adopted and a one-time password may be used.

As an example of the one-time password, (1) a scheme could be considered in which it is instructed to the user by using the screen of the first terminal 141 or the second terminal 161 that any of cells are extracted from a random number table delivered to the user from an operator of the server 121 (a code of a figure, a character, a diagram or the like is written in each cell), and a character string of codes extracted from the random number table is inputted from the second terminal 161. (2) In addition, another scheme could be considered in which the server 121 displays a one-time password on the screen of the first terminal 141, and the user inputs the displayed one-time password from the second terminal 161. (3) Moreover, another scheme may be adopted in which the server 121 displays the random number table on the screen of the first terminal 141, the user extracts codes from the cells based on an extraction rule allocated to the user, and the user inputs a character string of the extracted codes from the second terminal 161.

In the present embodiment, until the second authentication succeeds, the transaction content is not displayed on the screen of the second terminal 161. Therefore, when the second terminal 161 is lost or stolen, there is an advantage that the transaction content is not leaked even if the greater risk procedure is started without noticing the condition of the second terminal 161.

In the present embodiment, seeing the transaction content displayed on the screen of the second terminal 161 and carried out from now, the user indicates the confirmation if intending to execute this. The simplest technique for the confirmation is such as tapping or clicking an object (a button, a link and the like displayed on the screen) for execution of the transaction and pushing a return key.

As mentioned above, in the present embodiment, the user inputs the second password for the second authentication, but various modifications can be adopted for the second authentication. Also, in the present embodiment, the confirmation of the user to the execution of transaction is acquired by tapping or clicking a button or a link displayed on the screen together with the transaction content, but there are various modifications for the confirmation. These modifications will be described later.

By the way, in the Internet banking and the like, the server 121 functions as a web server, and a browser program runs on the first terminal 141 to access the server 121. In the present embodiment, the first terminal 141 can use a conventional browser program just as it is. Therefore, a processing flow when the server 121 cooperates with the first terminal 141 and the second terminal 161 will be described.

Figure 3:
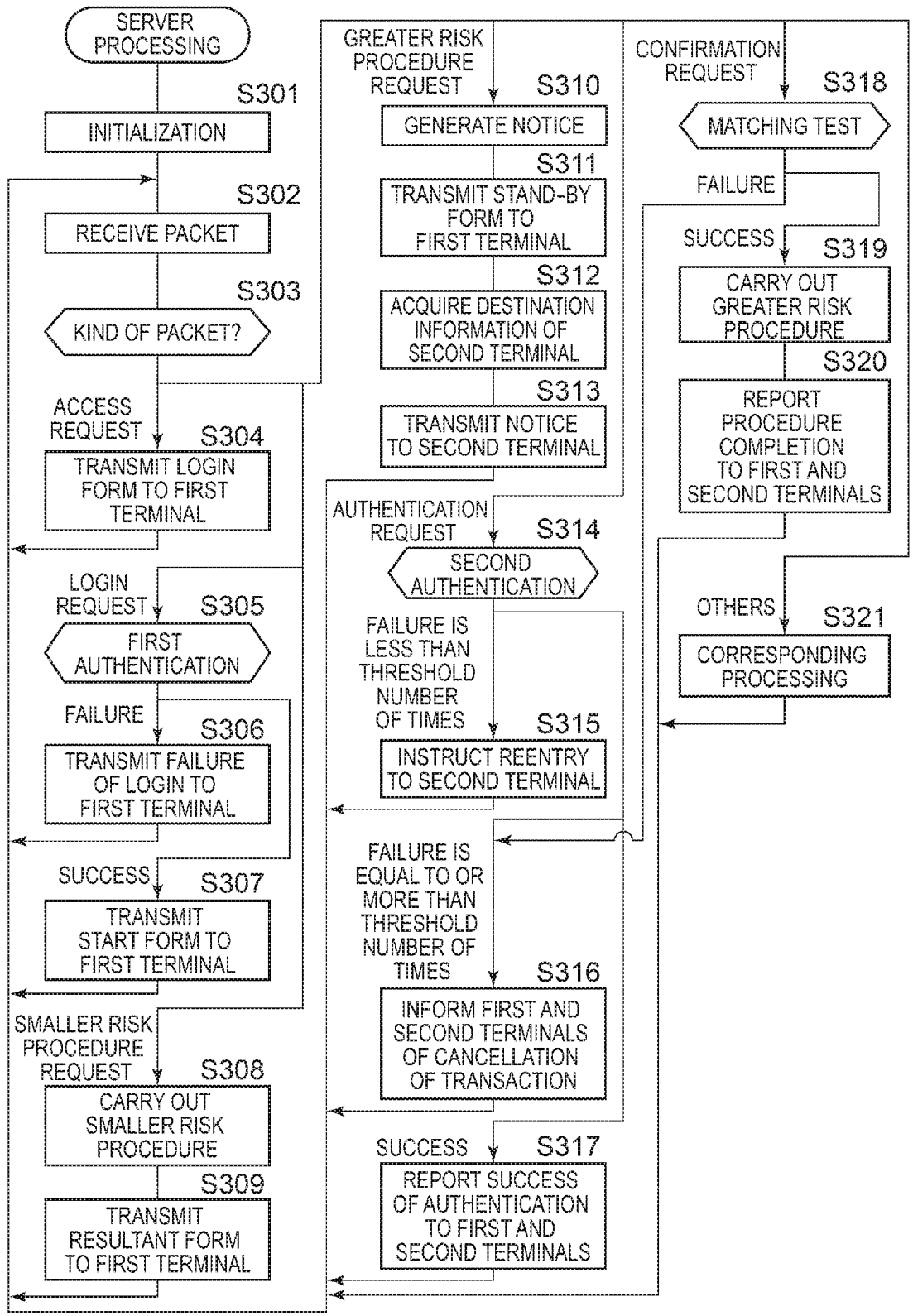
FIG. 3 is a flow chart showing a flow of processing in a server according to an embodiment of the present disclosure.

FIG. 3 is a flow chart showing a processing flow in the server according to an embodiment of the present disclosure. Hereinafter, referring to FIG. 3, the processing of the server will be described. The server processing shown in FIG. 3 is executed by executing a server program by the server 121. Also, in response to this, the browser program is executed in the first terminal 141, and a program for an exclusive-use application is executed in the second terminal 161.

Here, each program can be recorded in a non-transitory computer-readable information recording medium such as a compact disc, a flexible disk, a hard disk, a magneto-optic disc, a digital video disc, a magnetic tape, ROM (Read Only Memory), EEPROM (Electrically Erasable Programmable ROM), a flash memory, a semiconductor memory, and the like. This information recording medium can be delivered and sold independently from the computers which configure the server 121, the first terminal 141, and the second terminal 161.

Generally, the computer reads out the program recorded in the non-transitory information recording medium into RAM (Random Access Memory) as a temporary storage device, and a CPU (Central Processing Unit) or a processor executes commands contained in the read program. Here, in the architecture in which the ROM and the RAM can be mapped into one memory space, the CPU directly reads and executes commands contained in the program which is stored in the ROM.

Moreover, the above-mentioned program may be delivered or sold from a delivery device to the server 121, the first terminal 141, the second terminal 161, and the like, through a transitory transmission medium such as a computer communication network independent from a computer in which the program is executed. As mentioned above, the CPU, the processor and the like controls a NIC (Network Interface Card), a display, a microphone, a speaker and the like, in cooperation with the RAM and the like, in the server 121, the first terminal 141, the second terminal 161, and the like.

At first, after carrying out various types of initialization (Step S301), the server 121 receives a packet transmitted through a computer communication network (Step S302) and checks the content (Step S303).

If the packet received by the server 121 is an access request transmitted from the first terminal 141 (Step S303; access request), a login form used to input a user name and a password is transmitted to the first terminal 141 (Step S304) and then the processing returns to Step S302. Furthermore, the access request is transmitted from the first terminal 141 to the server 121 by specifying a URL (Universal Resource Locator) of the server 121 by the user in the browser running on the first terminal 141.

Figure 4:
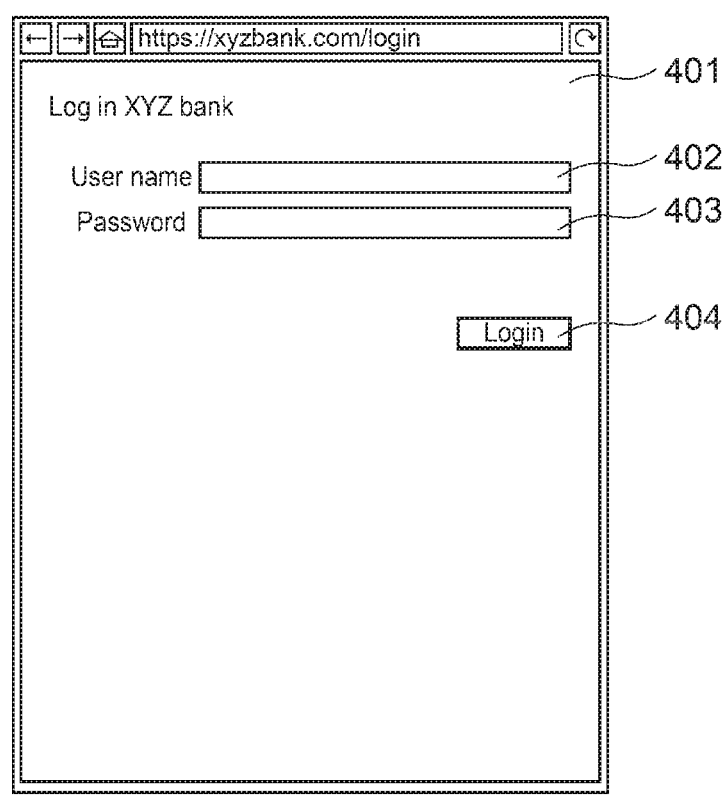
FIG. 4 is a display example of a login form to be displayed on a first terminal according to an embodiment of the present disclosure.

When receiving the login form, the browser running on the first terminal 141 displays this on the screen. FIG. 4 is a display example of the login form displayed on the first terminal according to an embodiment of the present disclosure. Hereinafter, referring to FIG. 4, the login form will be described.

A user name field 402, a password field 403, and a login button 404 are provided within the login form 401. The user inputs a user name allocated to its own bank account to the user name field 402. When clicking the login button 404 after inputting the password for the login to the password field 403, a login request is transmitted to the server 121 from the first terminal 141.

If the packet received by the server 121 is the login request having been transmitted from the first terminal 141 (Step S303; login request), the first authentication is tried based on the user name and the password which are specified by the login request (Step S305). If the first authentication fails (Step S305; failure), the server 121 transmits (Step S306) an error response of the failure in the login to the first terminal 141, and then the processing returns to Step S302.

On the other hand, if the first authentication succeeds (Step S305; success), the server 121 transmits to the first terminal 141, a start form in which links to the smaller risk procedures such as a balance inquiry, a transaction record inquiry, and links to the greater risk procedures of a transfer, an in-group transfer, application of fixed term deposit, application of a financial product, and change of the password are arranged (Step S307), and then the processing returns to Step S302.

When receiving the start form, the first terminal 141 displays this on the browser screen for the user to select a desired procedure. Then, a request according to the selected procedure is transmitted from the first terminal 141 to the server 121.

For example, it is supposed that the user selects the link of the transfer from the start form. At this time, a transfer form is generated and is transmitted to the first terminal 141.

Because the generation and transmission of the transfer form are equivalent to mere page transition which is not accompanied by the execution of transaction itself, it can be considered that it is the smaller risk procedure.

Generally, if the packet received by the server 121 is a smaller risk procedure request transmitted from the first terminal 141 (Step S303; smaller risk procedure request), the server 121 performs the smaller risk procedure in response to the request (Step S308), and transmits a resultant form to the first terminal 141 (Step S309) and then the processing returns to Step S302. Furthermore, links are arranged in the resultant form to execute various types of processing after that.

Figure 5:
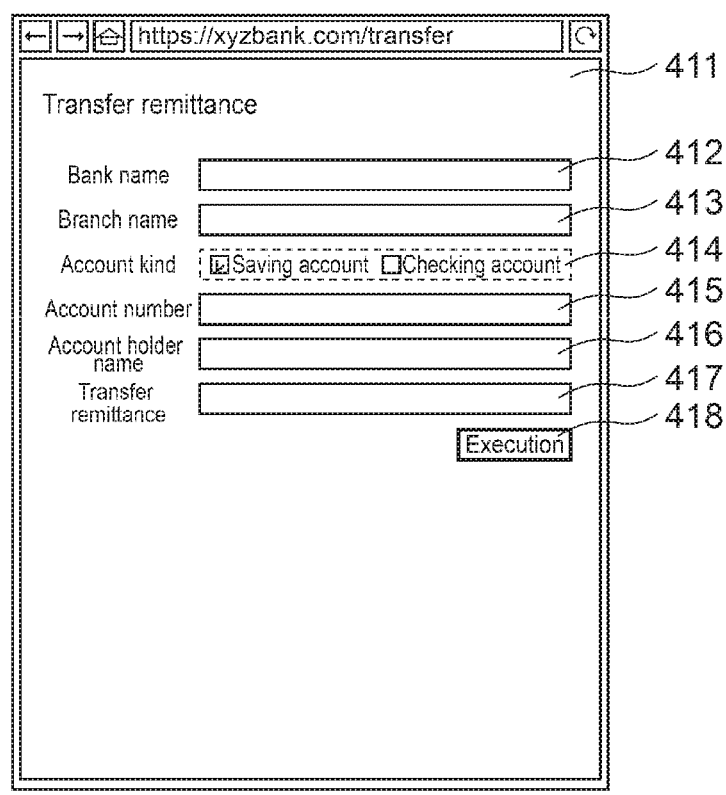
FIG. 5 is a display example of a transfer form that is displayed on the first terminal according to an embodiment of the present disclosure.

When a transfer form is transmitted to the first terminal 141, the browser of the first terminal 141 displays the transfer form on the screen. FIG. 5 is a display example of the transfer form which is displayed on the first terminal according to an embodiment of the present disclosure.

In the transfer form 411, a bank name field 412, a branch name field 413, a bank account kind field 414, an account number field 415, an account holder name field 416, a transfer remittance field 417, and an execution button 418 are arranged to specify a transfer destination. When clicking the execution button 418 after the user inputs transfer destination information to each field 412-417, the transfer request is transmitted from the first terminal 141 to the server 121. The transfer request is of a greater risk procedure transaction. Furthermore, in this example, transfer destination information is inputted to one form. However, the transfer destination information may be inputted in order through the transition of sequenced pages. Also, when the bank name field 412, the branch name field 413, the bank account kind field 414, and the bank account number field 415 are filled, the server 121 may acquire the registered holder name of the bank account from the database, and complements the account holder name field 416 to omit a direct input by the user. Besides, a list box to enable simple selection of the transfer destination which has been previously registered may be provided to assist the user with the input.

In the MITB attack, the content of transfer request to be transmitted is rewritten so that remittance is made to a bank account of the assailant.

If the packet received by the server 121 is the greater risk procedure request transmitted from the first terminal 141 (Step S303; greater risk procedure request), the server 121 allocates a transaction ID to a procedure (transaction) specified by the greater risk procedure request, and generates a notice indicating the transaction ID and the transaction content (Step S310). The transaction ID is linked to the greater risk procedure specified by the user. The server 121 uses the transaction ID to manage who is the user that specifies the greater risk procedure, which terminal is the first terminal 141 that is used for the greater risk procedure request, and which step is the progress situation of the greater risk procedure.

The server 121 transmits a stand-by form indicating the content of procedure (transaction) specified in the greater risk procedure request and the transaction ID to the first terminal 141 (Step S311).

Figure 6:
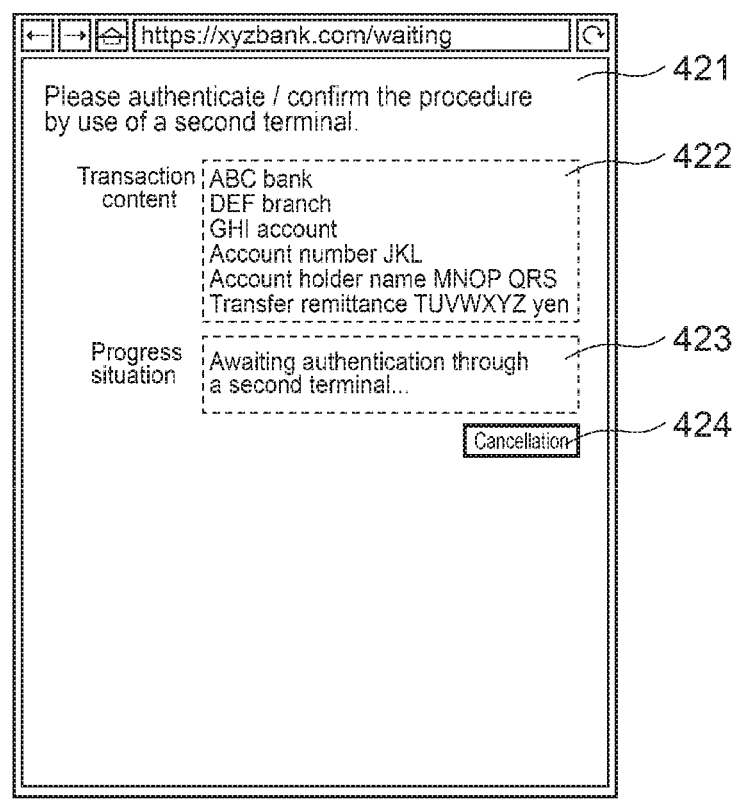
FIG. 6 is a display example of a stand-by form to be displayed on the first terminal according to an embodiment of the present disclosure.

When receiving the stand-by form, the browser of the first terminal 141 displays the stand-by form on the screen. FIG. 6 is a display example of the stand-by form displayed on the first terminal according to an embodiment of the present disclosure.

As shown in FIG. 6, the content of greater risk procedure received by the server 121 is displayed in the transaction content field 422 of the stand-by form 421. Also, the situation in which the status is in a stand-by state for the second authentication is displayed in the progress situation field 423.

When the progress situation of the greater risk procedure changes, the server 121 transmits the change to the first terminal 141. In the first terminal 141, a script specified in the stand-by form 421 awaits a report of the progress situation transmitted from the server 121, and displays a new situation in the progress situation field 423 when receiving the report. In the script, the transaction ID is used.

Moreover, a cancellation button 424 is provided within the stand-by form 421. When the user operates the cancellation button 424 before the second authentication through the second terminal 161 and confirmation, a request of the effect is transmitted to the server 121 from the first terminal 141. The server 121 carries out the cancellation of the transaction according to the transaction ID as the smaller risk procedure. Specifically, the effect that a transaction according to the transaction ID has been cancelled is recorded in the database and the like to link to the transaction ID. The resultant form indicating the result is transmitted from the server 121 to the first terminal 141 and the browser of the first terminal 141 displays the resultant form on the screen.

In the MITB attack, data in the transaction content field 422 displayed in the stand-by form 421 is sometimes changed to the bank account of the assailant and displayed, and to the original transfer destination. However, in the present embodiment, the transaction content that has been instructed to the server 121 by the first terminal 141 are transmitted to the second terminal 161, just as it is.

Subsequently, the server 121 acquires the destination information of the second terminal 161 which has been previously registered to the user who logged in from the first terminal 141 from the database (Step S312), and transmits a generated notice to the second terminal 161 (Step S313), and then the processing returns to Step S302.

Figure 7:
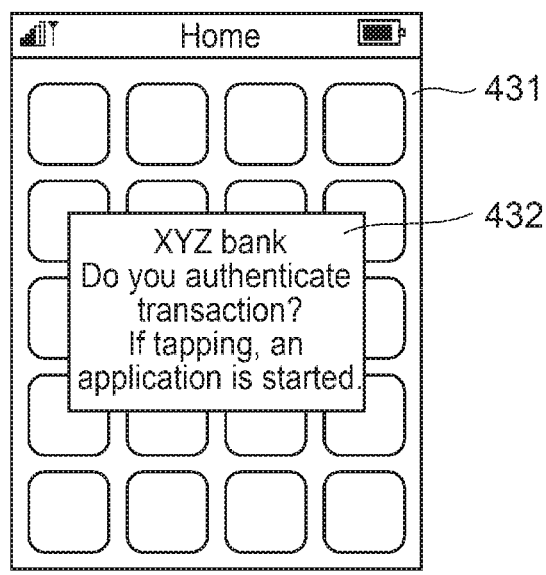
FIG. 7 is a display example of a notice to be transferred to a second terminal according to an embodiment of the present disclosure.

A push notice to the exclusive-use application running on the second terminal 161 can be adopted for the transmission of the notice. When the push notice arrives at the second terminal 161, a notice area that has been prepared by the operating system of the second terminal 161 is automatically popped up to display the effect. FIG. 7 is a display example of a notice transmitted to the second terminal according to an embodiment of the present disclosure. In the example shown in FIG. 7, a notice 432 indicative of arrival of a notice about the greater risk procedure is displayed in a home screen 431 of the second terminal 161.

When the user taps or clicks the notice 432 displayed in the home screen 431 of the second terminal 161, or taps or clicks the notice 432 on a list of notices displayed in a notice center, or taps or clicks an icon of the exclusive-use application, the exclusive-use application is started up. It is possible to set for the exclusive-use application to be automatically started up, when the notice arrives, depending on the specification of the second terminal 161.

In addition, URL to a web application that achieves the same function as the above exclusive-use application may be transmitted to the SMS, the mail address and the like which are allocated to the second terminal 161. In the present embodiment, when the user selects the URL, the browser of the second terminal 161 is started up to execute the web application.

Furthermore, the second terminal 161 may acquire the notice from the code captured by the second terminal 161 by the server 121 displaying the notice content on the stand-by form of the first terminal by encoding the notice content to codes such as the ciphered character string, the one-dimensional code, and the two-dimensional code, by user starting up the exclusive-use application and by capturing the code displayed on the stand-by form 421 by a camera of the second terminal 161.

Figure 8:
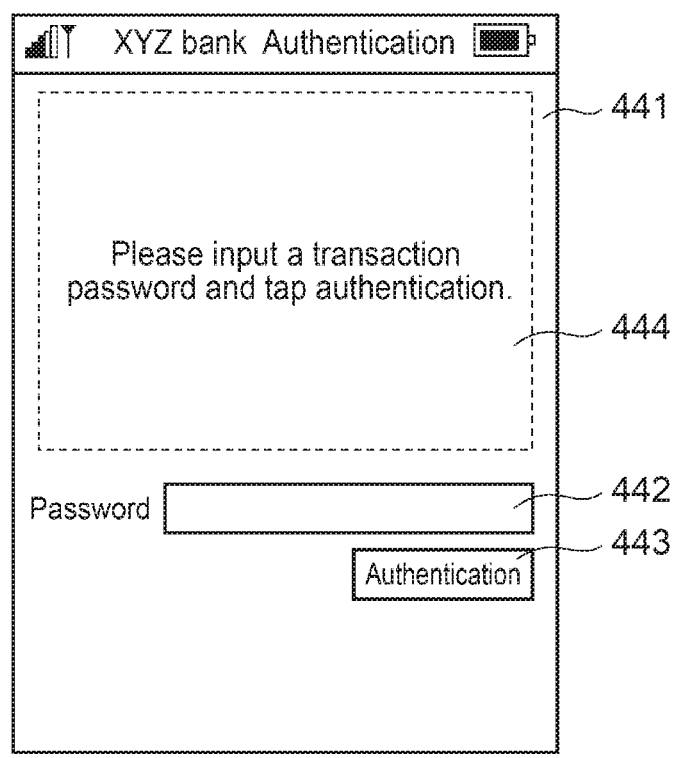
FIG. 8 is a display example of an authentication form of an exclusive-use application that is started up, on the second terminal according to an embodiment of the present disclosure.

When the exclusive-use application is started up in the second terminal 161 to which the notice has been transmitted, an authentication form is displayed on the screen of the second terminal 161. FIG. 8 is a display example of the authentication form of the exclusive-use application that is started up in the second terminal according to an embodiment of the present disclosure.

As shown in FIG. 8, a password field 442 and an authentication button 443 are provided within the authentication form 441, and in addition, the indication of "password should be inputted for the second authentication" is displayed in a message field 444. When the user inputs the password for transaction to the password field 442 and taps or clicks the authentication button 443, an authentication request in which the transaction ID and the password for transaction are specified, is transmitted from the second terminal 161 to the server 121.

If the packet received by the server 121 is the authentication request transmitted from the second terminal 161 (Step S303; authentication request), the server 121 tries the second authentication (Step 314). In the second authentication, the following conditions are examined.

(1) Is the greater risk procedure according to the transaction ID which is specified in the authentication request is ongoing (is it cancelled)?

(2) Is a notice transmitted to the second terminal 161 of a transmission source according to the transaction ID?

(3) Is the password for transaction specified in the authentication request proper as the password of the user who has specified the greater risk procedure according to the transaction ID?

If all of the conditions are met, it means that the second authentication succeeds. If the second authentication fails and the continuous number of times of the failure is less than the threshold number of times (Step S314; less than the threshold number of times), the server 121 instructs the second terminal 161 to make the user input the password for transaction again (Step S315), and then the processing returns to Step S302.

Figure 9:
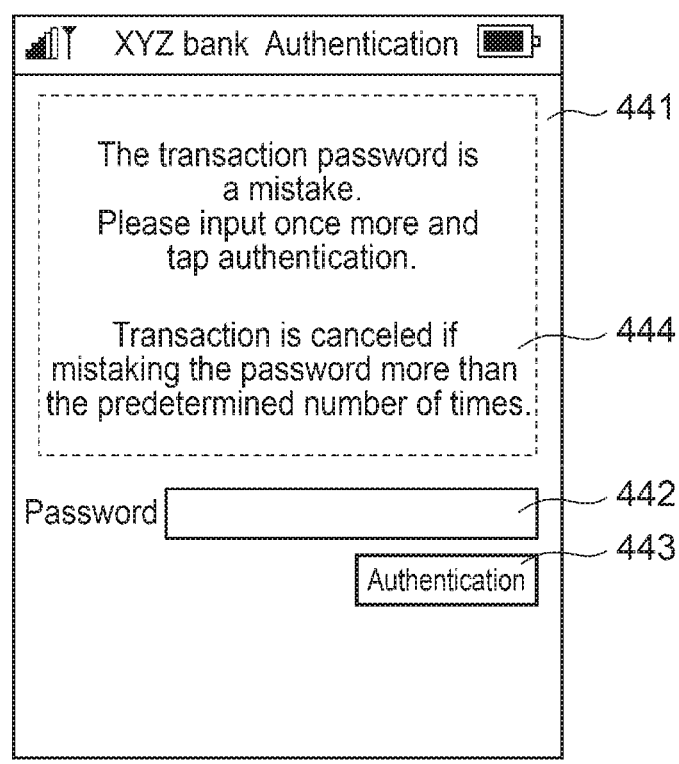
FIG. 9 is a display example of an authentication form when a retry is requested, on the second terminal according to an embodiment of the present disclosure.

FIG. 9 is a display example of the authentication form in which the retry is requested in the second terminal according to an embodiment of the present disclosure. In the authentication form 441 of the second terminal 161, the effect that the reentry was requested from the server 121 is displayed in the message field 444, and the user can input a password for transaction once again.

If the second authentication fails, and the continuous number of times of failure is equal to or more than the threshold number of times (Step S314; equal to or more than the threshold number of times), the server 121 informs the first terminal 141 and the second terminal 161 of the cancellation of transaction (Step S316) and then the processing returns to Step S302.

Figure 10:
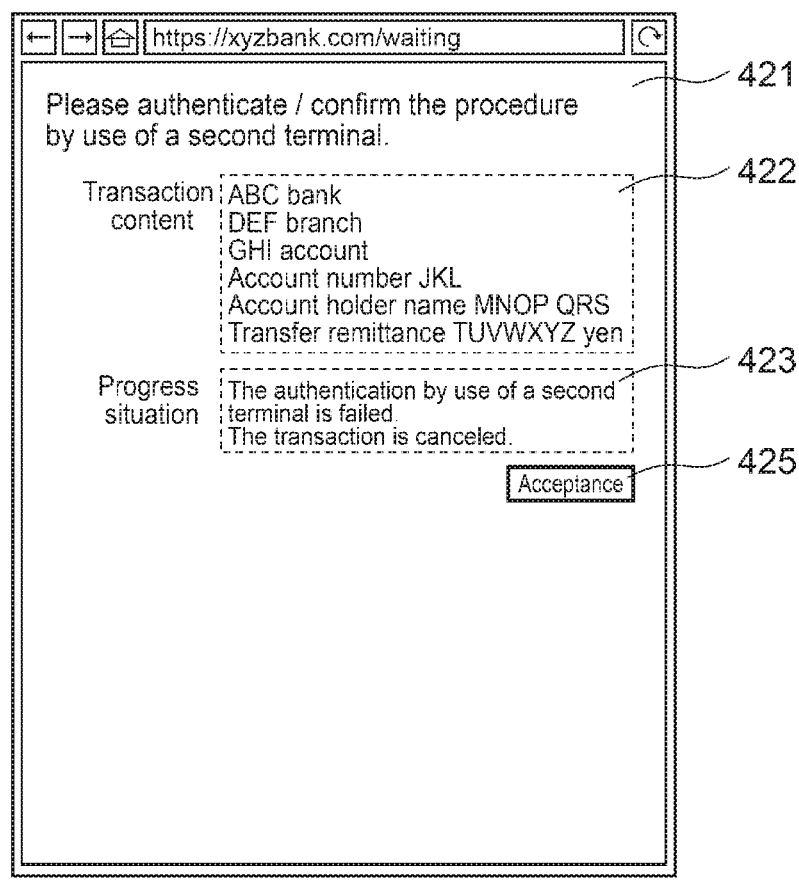
FIG. 10 is a display example of a stand-by form showing that the transaction has been cancelled, on the first terminal according to an embodiment of the present disclosure.

In the first terminal 141, the script which has received a cancellation notice updates the display of stand-by form 421. FIG. 10 is a display example of the stand-by form showing the cancellation of transaction on the first terminal according to an embodiment of the present disclosure. As shown in FIG. 10, the cancellation of transaction is displayed in the progress situation field 423 of the stand-by form 421, the cancellation button 424 is hidden, and an acceptance button 425 is displayed instead. When the user operates the acceptance button 425, the browser transits to the start form and the like.

Figure 11:
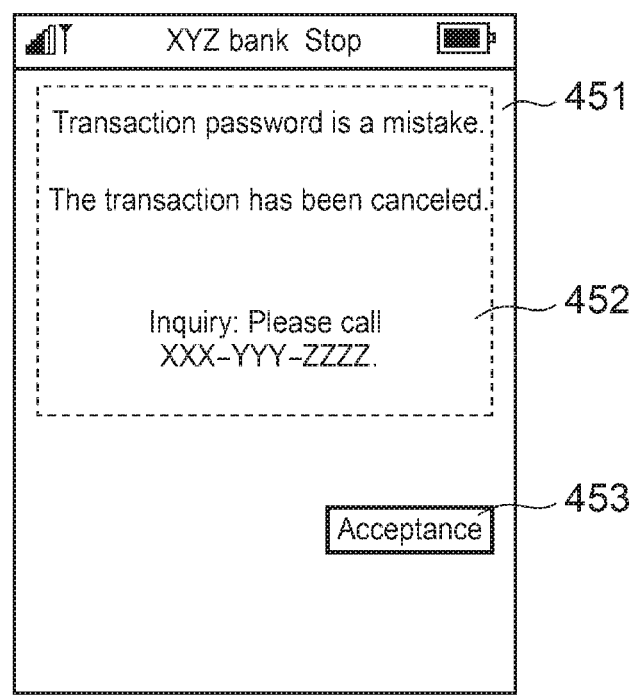
FIG. 11 is a display example of a cancellation form which is displayed on the second terminal according to an embodiment of the present disclosure.

When the exclusive-use application receives a cancellation notice in the second terminal 161, a screen display is updated and a cancellation form is displayed. FIG. 11 is a display example of the cancellation form displayed on the second terminal according to an embodiment of the present disclosure. As shown in FIG. 11, the cancellation of transaction is displayed in a message field 452 of the cancellation form 451. Also, when an acceptance button 453 is tapped, the display content in the message field 452 is erased and a management form of the exclusive-use application and the like are displayed.

On the other hand, when the second authentication succeeds (Step S314; success), the server 121 reports the authentication success to the first terminal 141 and the second terminal 161 (Step S317) and then the processing returns to Step S302.

Figure 12:
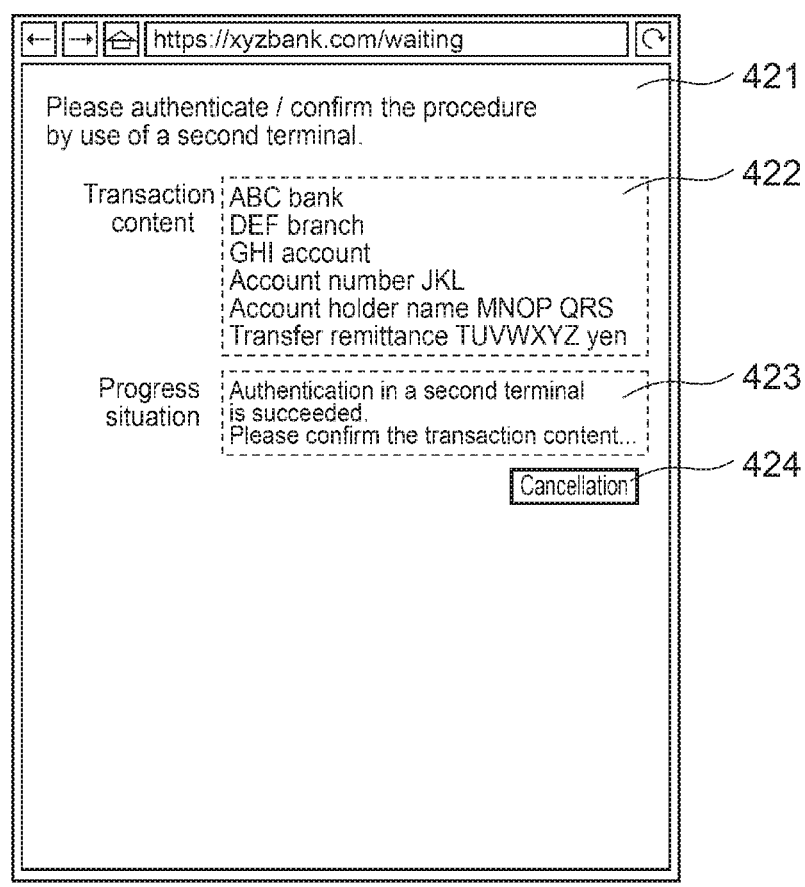
FIG. 12 is a display example of a stand-by form showing that a second authentication has succeeded on the first terminal according to an embodiment of the present disclosure.

In the first terminal 141, the script that has received the report of success of the second authentication updates a display of the stand-by form 421. FIG. 12 is a display example of the stand-by form showing the success of the second authentication in the first terminal according to an embodiment of the present disclosure. As shown in FIG. 12, it is displayed in a progress situation field 423 of the stand-by form 421 that the second authentication succeeds and the user's confirmation is awaited in the second terminal 161.

Figure 13:
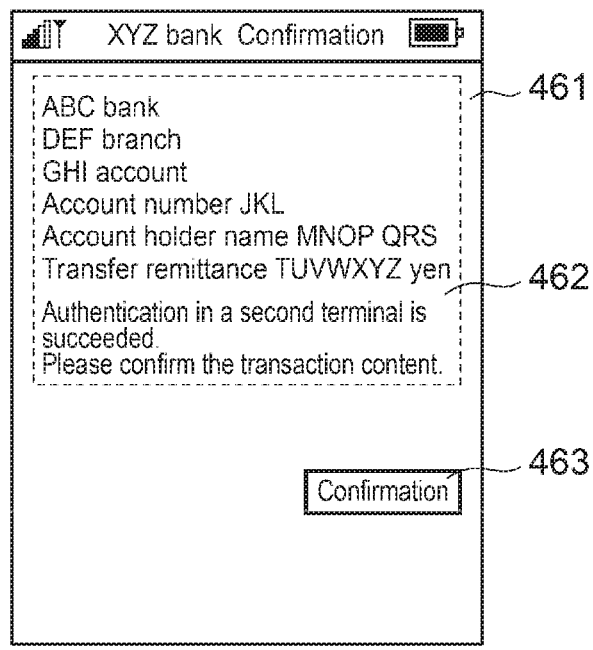
FIG. 13 is display example of a confirmation form that is displayed on the second terminal according to an embodiment of the present disclosure.

On the other hand, when the exclusive-use application has received the report of the authentication success in the second terminal 161, the display is changed from the authentication form to a confirmation form. FIG. 13 is a display example of the confirmation form of the second terminal according to an embodiment of the present disclosure. As shown in FIG. 13, the details of the transaction content for this time are displayed in the message field 462 of the confirmation form 461. The details of the transaction content are already acquired in the second terminal 161 by a previously received notice. Therefore, by confirming the transaction ID specified in the report of the authentication success and the content of received notice, the content of greater risk procedure can be displayed in the message field 462.

Furthermore, the content of greater risk procedure is not specified and the content of greater risk procedure may be specified in the report of the success that is transmitted to the second terminal 161 from the server 121 after the second authentication succeeds.

Furthermore, the confirmation form 461 is provided within the confirmation button 463. A confirmation request to specify the transaction ID is transmitted from the second terminal 161 to the server 121, when the user taps or clicks the confirmation button 463.

Furthermore, when there is a mistake in the transaction content, it is sufficient to operate the cancellation button 424 in the stand-by form 421 that is displayed in the browser of the first terminal 141. However, the cancellation button may be provided in the confirmation form 461 and the transaction may be cancelled, when the user taps the cancellation button.

Furthermore, when the packet received by the server 121 is the confirmation request transmitted from the second terminal 161 (Step S303; confirmation request), the server 121 checks the matching of the confirmation request (Step S318). Specifically, the following items are checked.

(1) Is the greater risk procedure according to the transaction ID specified in the confirmation request continued (Is not stopped)?

(2) Is a transmission source terminal of the confirmation request the second terminal 161 in which the second authentication for the transaction ID succeeded?

Because it is not possible to continue the transaction if the confirmation request does not pass this examination (Step S318; failure), the processing advances to Step S316 and the transaction is stopped or cancelled.

On the other hand, if the confirmation request passes this examination (Step S318; success), the server 121 executes the greater risk procedure (Step S319). That is, in the present embodiment, a transfer remittance linked with the transaction ID is carried out. Also, the progress situation of the transaction linked with the transaction ID is updated and completed.

The server 121 reports a completion of transaction to the first terminal 141 and the second terminal 161 (Step S320) and then the processing returns to Step S302.

Figure 14:
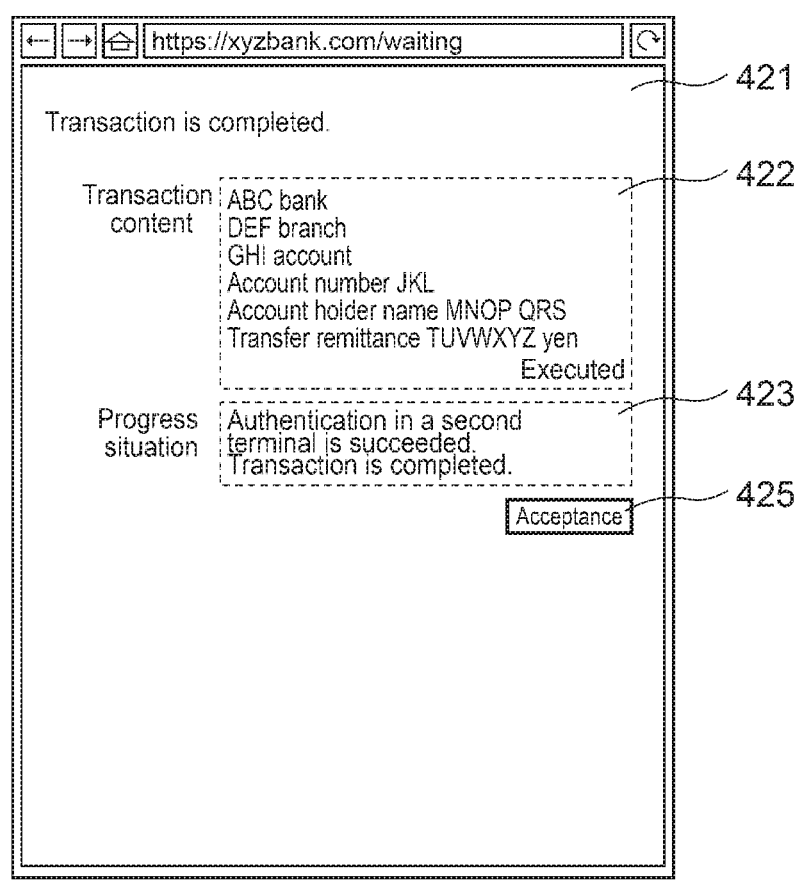
FIG. 14 is a display example of a stand-by form showing that the transaction has been completed in the first terminal according to an embodiment of the present disclosure.

In the first terminal 141, when receiving the report of the transaction completion, the script updates the display of the stand-by form 421. FIG. 14 is a display example of the stand-by form showing that the transaction has been completed in the first terminal according to an embodiment of the present disclosure. As shown in this FIG. 14, the completion of the transaction is displayed in the progress situation field 423 and the transaction content field 422 of the stand-by form 421. Also, because the transaction has been completed, the cancellation button 424 is hidden and an acceptance button 425 is displayed instead. When the user operates the acceptance button 425, the browser transits to the start form and the like.

Figure 15:
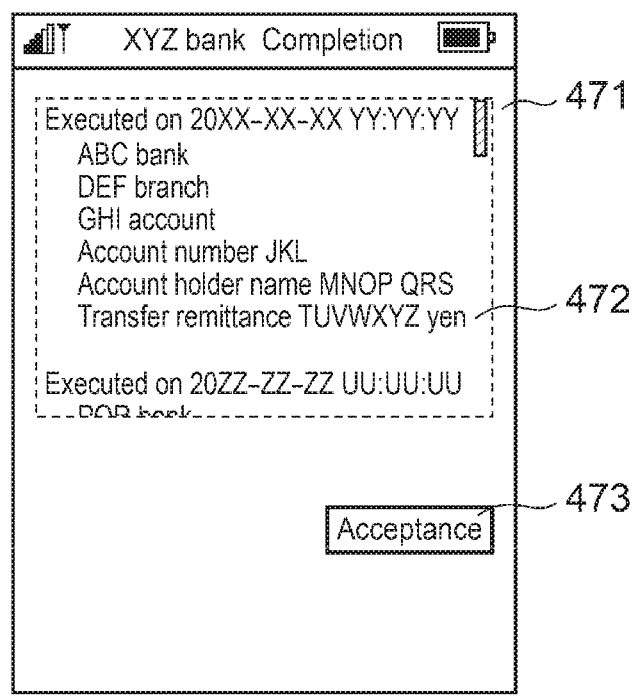
FIG. 15 is a display example of a complete form showing that the transaction has completed, on the second terminal according to an embodiment of the present disclosure.

On the other hand, when the exclusive-use application receives the report of the authentication success in the second terminal 161, the display is changed from the confirmation form to a completion form. FIG. 15 is a display example of the completion form showing that the transaction has completed, in the second terminal according to an embodiment of the present disclosure. In the completion form 471, the record of the transaction which has completed is displayed scrollably in the record field 472. Also, when the acceptance button 473 is tapped, the management form of the exclusive-use application and the like is displayed.

Furthermore, it is desirable that when a notice is transferred from the server 121, the exclusive-use application running on the second terminal 161 automatically changes the form to be displayed on the screen to the authentication form 441. Furthermore, when the exclusive-use application corresponds to notices in the servers 121, a tab is prepared for every server 121, and the processing of a series of forms makes it possible to change for every server 121.

Furthermore, the packet received by the server 121 is a packet of another kind (Step S303; others), the server 121 executes a corresponding piece of processing (Step S321) and then the processing returns to Step S302.

In this way, in the present embodiment, the first authentication according to the login is carried out from the first terminal 141 for the user to access the server 121, and the second authentication according to the greater risk procedure (transaction) is started from the second terminal 161 to which a notice has been transferred from the server 121. Then, after the second authentication succeeds, the transaction content is presented to the user through the second terminal 161. After confirming the transaction content on the second terminal 161, the transaction is executed.

For this reason, because the transaction content is transferred to the user through a route through which the MITB attack never occurs even if the MITB attack is received, damage can be prevented.

Also, in one embodiment, it is required to input the password from the second terminal 161 in the second authentication. Therefore, even when trying to start a transaction without noticing that the second terminal 161 is lost or stolen, the transaction content is never leaked to a finder of the second terminal 161.

Furthermore, because the second authentication is carried out based on the information which the user inputs to the second terminal 161, the confirmation of the transaction is not necessary to carry out from the second terminal 161, and it may be carried out from the first terminal 141. In this case, it is desirable to combine with the technique which prompts for the user to consider the content of the transaction that is displayed on the second terminal 161, to be described later.

Furthermore, in the above-mentioned explanation, to facilitate the understanding of the operation of the server 121, the first terminal 141, the second terminal 161, the processing when an error has occurred, and the like are omitted appropriately. However, according to the design of the system and the configuration of a site, these operations and the flow of control can be appropriately changed.

Embodiment 2

In the above embodiment, the user inputs the second password to the second terminal 161, and the content of the greater risk procedure is set to be not displayed on the screen of the second terminal 161 until the second authentication succeeds. The present embodiment automates the second authentication.

In the present embodiment, when the server 121 ciphers a notice content, and the second terminal 161 tries to decipher the ciphered notice and succeeds in this, it is regarded as the second authentication succeeded. In this example, the second terminal 161 functions as a token for the authentication.

In the present embodiment, it is possible to adopt an example in which the server 121 and the second terminal 161 generate a common key for synchronizing in time, as a cipher system. That is, in the server 121, the notice is ciphered with the common key generated by the server 121. When the ciphered notice is transferred to the second terminal 161 in a period from the ciphering to the term of validity of the common key, the second terminal 161 deciphers the ciphered notice with the common key generated by the second terminal 161.

Furthermore, it is possible to adopt a public key encryption to the present embodiment. That is, the user generates a pair of a publication key and a secret key by the second terminal 161 as the destination of the notice. When the second terminal 161 should be registered on the server 121, the publication key is transferred to the server 121. In the server 121, when the notice should be transmitted, the notice is ciphered with the publication key and the second terminal 161 deciphers the ciphered notice with the secret key.

Furthermore, in time synchronizing encryption, a seed must be shared by the server 121 and the second terminal 161. However, when the seed is transferred from one to the other, the security can be more improved by using the public key encryption.

Furthermore, in the above-mentioned example, the second authentication is automatically executed and the second password may optionally be used. However, the second password may be used to carry out the authentication by the user sufficiently.

That is, after the second authentication succeeds and the content of the greater risk procedure is displayed on the screen of the second terminal 161, the second terminal 161 requests the user to input the transaction password.

The second terminal 161 and the server 121 cooperate with each other to carry out the authentication (third authentication) using the inputted transaction password. If the third authentication succeeds, the confirmation of the transaction made by the user is regarded as having been made and the server 121 executes the transaction.

This example is similar to examples of the Internet banking used widely at present. However, because the transaction content is ciphered in the server 121 and deciphered in the second terminal 161, the MITB attack on the first terminal 141 can be nullified. That is, if the information of a transfer destination, a transfer remittance and the like which are inputted by the user to the first terminal 141 and the information of the transfer destination, the transfer remittance and the like which are displayed on the second terminal 161 are not in agreement with each other, the user can determine that there is some attack.

Embodiment 3

To restrain the MITB attack, the user needs to sufficiently check and confirm the content of greater risk procedure (transaction) which is displayed on the screen of the second terminal 161 after the second authentication succeeds.

That is, the user needs to confirm whether the content of greater risk procedure inputted to the first terminal 141 is in agreement with the content of greater risk procedure displayed on the second terminal 161. Therefore, it is desirable to promote the user to compare both in order to suppress damage due to the MITB attack or the other. This embodiment promotes the user to sufficiently check and confirm the transaction content displayed on the second terminal 161. This embodiment can be used instead of the confirmation by using a transaction password in an embodiment in which the second authentication is automatically carried out.

Figure 16:
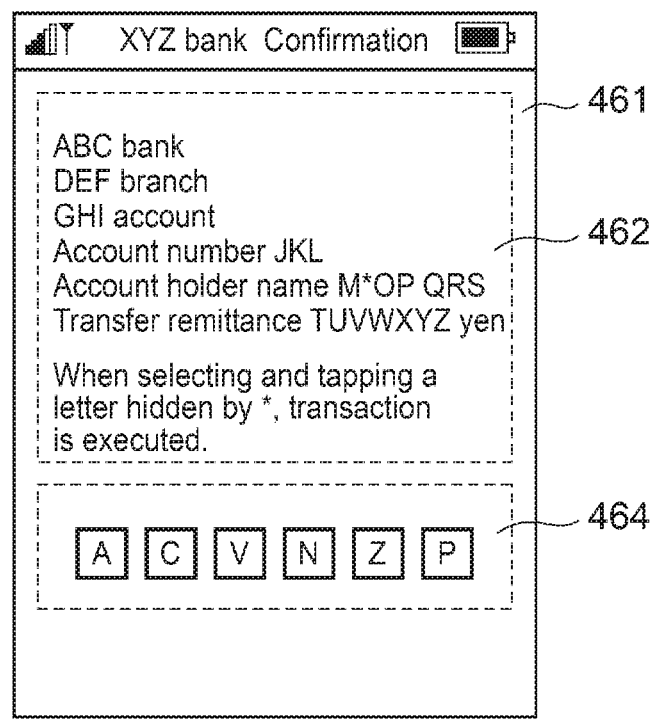
FIG. 16 is a display example of a confirmation form that is displayed on the second terminal according to an embodiment of the present disclosure.

FIG. 16 is a display example of the confirmation form displayed on the second terminal according to an embodiment of the present disclosure. Hereinafter, referring to FIG. 16, the example will be described.

In the confirmation form 461 shown in FIG. 16, the details of the transaction content for this time are displayed in the message field 462. However, a part of the displayed content contains hidden letters. The part set to the hidden letters may be any part of the letters or figures of a name of the account holder, a bank name, a branch name, an account number, and the like of the transfer destination. Also, in the present embodiment, the second terminal 161 randomly determines the part to be set to the hidden letters.

Then, selection buttons 464 are provided instead of the confirmation button 463.

In an example shown in FIG. 16, one letter of the name of the transfer destination account holder is set to the hidden letter (expressed by "*" in FIG. 16). Answers to the hidden letter are listed up in the selection buttons 464. One correct answer and multiple incorrect answers are prepared in the selection buttons 464 shown here.

Because the user should know the content of transaction which the user tries to execute, it should be easy to replace or fill in the hidden letters. Also, even if the transfer destination has been rewritten by the MITB attack, it is possible to sufficiently check and to easily notice the attack, because the user tries to check the part set to the hidden letters.

When the user chooses the correct answer from the selection buttons 464, the second terminal 161 assumes that the confirmation by the user has been made, and transmits a confirmation request to the server 121. Also, if the user chooses an incorrect answer, a warning is displayed to check the transaction content again, and an input to the confirmation form 461 is requested once again.

Furthermore, the selection buttons 464 are not used and a text field and a list box to input the part set to the hidden letters may be prepared, and the confirmation button 463 may be provided. In this case, if the confirmation button 463 is operated after the user selects the correct answer, the second terminal 161 transmits the confirmation request to the server 121.

Also, in the above-mentioned explanation, the input for confirmation is entered at the second terminal 161, but may be entered at the first terminal 141. In the present embodiment, by filling or supplementing the part set to the hidden letters by the user, it can be guaranteed that the user has checked the transaction content displayed on the second terminal 161. In this embodiment, when the hidden letters are randomly determined by the second terminal 161, various schemes can be adopted in such a manner that the correct answer is transmitted from the second terminal 161 to the server 121, or an answer inputted in the first terminal 141 is transmitted to the second terminal 161 through the server 121 to allow the second terminal 161 to make a determination.

Furthermore, in the above-mentioned description, two kinds of authentication such as the first authentication at the time of login and the second authentication at the time of transaction execution are adopted, from the viewpoint of improved security. However, when applying to the transaction system using the email for a mobile phone which has been used conventionally without using any exclusive-use application, it is possible to omit the second authentication at the time of the transaction execution, shift the timing of the second authentication, or set a destination to give an input for the user confirmation to a destination except the mobile phone.

That is, when the user logs in to the server 121 through the first terminal 141 and the server 121 receives a transaction instruction from the user through the first terminal 141, the server generates a notice to be transmitted to the second terminal.

The details of the content of transaction (for example, the registered holder name of transfer destination, bank name, branch name, a kind of an account, an account number, a transfer remittance) are specified in this notice but a part thereof is set as hidden letters. For example, when the transaction in which the transfer destination bank is an "ABC bank", the branch name is "DEF" branch, the account kind is "GHI" account, the account number is "JKL", the registered holder is "MNOP QRS", and the transfer remittance is "TUVWXYZ" yen is tried, portions of the hidden letters (shown by "*" below) are randomly specified to generate the following transaction content.

"The transaction of A*C bank, *EF branch, the account kind of GHI, account number of *KL, the registered holder of M*OP QR*, and TUV*XYZ yen is tried. If this transfer is correct, please input the confirmation code containing letters and figures having the hidden letters shown by "*" from the terminal that has been used to log in to the Internet banking".

One or more portions may have the hidden letters. Also, a predetermined portion (for example, lower 4 digits of the account number) may be set to hidden letters and may be determined randomly.

Then, the server 121 transmits to the second terminal 161 assigned to the user by email or SMS, a notice that specifies the transaction content in which the hidden letters are used for a part of the transaction content.

When receiving the notice, the user sees the transaction content displayed on the second terminal 161, and arranges letters, figures, and symbols to fill the part set to the hidden letters in order from the top, to generate the confirmation code. In the above-mentioned example, the confirmation code is "BDJNSW".

Then, the user inputs the confirmation code to the first terminal 141. When the confirmation code inputted from the first terminal 141 is agreement with an arrangement of letters and figures corresponding to the hidden letters in the notice, the server 121 regards as it is confirmed that the user accepted the execution of the transaction. Most simply, if there is the confirmation, the transaction may be executed in response to it. That is, the second authentication based on the transaction password can be omitted. For example, because a part of the notice has the hidden letters, it is possible to prevent the leakage of the account number, if the part set to the hidden letters is always selected from the account number.

Also, as mentioned above, the transaction may be executed, after the authentication is further carried out by making the user input the transaction password through the first terminal 141 or the second terminal 161 in addition to the confirmation code obtained from the hidden letters.

When the user sees the notice on the second terminal 161, and notices that the transfer destination is changed through an MITB attack and the like, the transfer can be cancelled by operating the cancellation button 424 from the first terminal 141, and the like. When an unknown transaction is to be executed, the user has a contact with the administrator of the server 121 because there is a possibility that the user name and the password for the login are leaked.

Conventionally, a system has been proposed in which the server 121 specifies the positions of cells to be extracted from a random number table delivered previously to the user and the user inputs letters and figures at the positions. However, in the present embodiment, because a character or letter string as an object to be extracted changes dynamically, similarly to extraction from the random number table according to the transaction content, the security can be improved compared with case of use of the fixed random number table. Also, it is necessary that the user check the transaction content strictly in order to obtain the confirmation code from the hidden letters. Therefore, a careless action of executing the transaction without checking the transaction content well can be restrained, and the MITB attack can be effectively prevented.

Embodiment 4

Below, various applicable techniques will be described in addition to or in place of each of the above embodiments.

(Procedure of Registration)

In each of the above-mentioned embodiments, it is assumed that the user uses as the second terminal 161, a terminal registered previously on the server 121 in correspondence to the account of the user. The following procedure can be adopted for the registration.

First, the user registers the phone number at the time of the contact of a bank account. Then, the user starts an exclusive-use application in a new second terminal 161 to be linked to the bank account and inputs a user name and a login password.

If the login to the server 121 from the exclusive-use application succeeds, the server 121 calls the phone number of the user to notify the user of an authentication code for registration by sound.

When the user inputs the authentication code from the exclusive-use application of the new second terminal 161, a check is carried out in the server 121, and the new second terminal 161 is linked to the account of the user as the destination of the notice, if both match with each other.

(One-Time Password)

There is an example having as a requisite condition that the exclusive-use application is started previously in the second terminal 161 assigned to the user has been, as a scheme for the first authentication.

That is, the exclusive-use application in the second terminal 161 accesses the server 121 at the time of start-up to notify the server 121 of the operating condition. When there is a login request from the first terminal 141, the server 121 determines that the first authentication succeeds and admits the login by the user, when the exclusive-use application is running in the second terminal 161 linked to the specified user name and the password specified in the login request is valid.

In this example, in addition to adoption of fixed data as the login password, a random number table may be acquired from the server 121 when the exclusive-use application of the second terminal 161 accesses the server 121, and the user may acquire one-time password by extracting the contents of cells from the random number table based on an extraction rule assigned to the user, resulting in using it as the login password.

In this example, the exclusive-use application in the second terminal 161 has already started up when the user intends to execute the transaction. Accordingly, as in the above embodiments, it is sufficient that the server 121 transmits to the exclusive-use application operating on the second terminal 161, in case of transmission of a notice.

The input of the transaction password and the input for confirmation of the transaction may be carried out from the second terminal 161 or from the first terminal 141, as mentioned above.

According to the present example, terminals for notice can be assigned to the user. When any of the terminals for notice should be used as the second terminal 161, it is sufficient that an exclusive-use application is made operate in the terminal and the login operation is started through the first terminal 141 after accessing the server 121.

In the present example, even when one terminal for notice (for example, a mobile phone, which is connectable to a mobile phone communication network that is often, usually used) is lost or stolen, the registration of the terminal for notice, which has been lost or stolen, can be canceled by making the second authentication by another terminal for notice (for example, a tablet terminal in which only a Wi-Fi connection is possible).

(Authentication Using Hidden Letters)

In the above embodiment, in the authentication using the hidden letters, original letters and figures are inputted by the user for the confirmation code. However, a random letter string allocated for the correct answer option may be adopted for the confirmation code.

For example, in an example of the above-mentioned transfer destination, in an example that the hidden letters are always used as lower 2 digits of the account number, the following notice is sent.

"A transfer is intended to be carried out in which TUVWXYZ yen is transferred to the ABC bank, DEF branch, GHI bank account, account number J, registered holder MNOP QRS. If this transfer is correct, please chose a part of the hidden letters of  from among the following three options and input the confirmation code of the chosen option. If  is AB, the confirmation code is 531338, if  is KL, the confirmation code is 123456, and if ** is QR, the confirmation code is 789012".

Because the correct answer is KL, the authentication code becomes 123456.

Generally, when a part to be hidden is of the bank name, the branch name, the registered holder name and the like, there is a case that the hidden letters or characters are letters or characters relatively difficult to input such as alphabet, Kana characters, kanji character. In this example, because the server 121 generates a confirmation code, it can be configured from letter types easy to input in the first terminal 141 and the second terminal 161 (only figures as mentioned above), to aim at the convenience of the user.

When a notice is transmitted in an email to the second terminal 161 of a mobile phone, and the confirmation code is inputted to the first terminal 141, it is difficult to prevent a MITB attack in an example that merely sends the confirmation code from the server 121, and even if the transaction content is transmitted together, the MITB attack has succeeded if the user does not check the transaction content in detail. However, in this example, because the user checks the transaction content precisely, the MITB attack can be effectively prevented even if the input of the confirmation code is made from either of the first terminal 141 or the second terminal 161.

Embodiment 5

The present embodiment is a modification example of the authentication which uses the hidden letters in the above embodiment. That is, in the above embodiment, a part of the details of transaction content is changed to the hidden letters, and the user directly inputs the part of the hidden letters or selects from among options, and if the input matches with the part of the hidden letters, the transaction has been executed. This is equivalent to determination of whether the transaction is to be executed based on whether the input by the user matches with the details of transaction content to be executed (no contradictory) or contradicts it (non-matching). In the present embodiment, widely, generally, this determination reference is adopted.

As shown in FIG. 2, when the server 121 receives the transaction instruction (208) through the first terminal 141, the server 121 transmits the notice (209) to the second terminal 161.

There are the following examples that the notice is sent from the server 121 to the second terminal 161.

(1) When an exclusive-use application is running in the second terminal 161, the notice is sent from the server 121 to the second terminal 161 through a notice mechanism provided by the operating system operating on the second terminal 161.

(2) The notice is sent from the server 121 to the second terminal 161 by email, the SMS and the like. The email and the like may be adopted in a text form in which URL to be accessed by the browser of the second terminal is written. Or, the user may adopt the HTML form in which an operable button, a link and the like are arranged.

(3) Codes such as one-dimensional code, a two-dimensional code are displayed on the screen of the first terminal 141 from the server 121, the user captures the codes displayed in the stand-by form 421 by using a camera of the second terminal 161, and the notice can be acquired from the codes captured by the second terminal 161. The information acquired from the code may be URL to be accessed by the browser of the second terminal 161. Also, when capturing is carried out by using the exclusive-use application, only the session information may be acquired from the code.

(4) When the second terminal 161 is a mobile phone, the server 121 sends out the notice to the second terminal 161 by issuing a call to the second terminal 161 and carrying out communication by an automatic sound.

Figure 17:
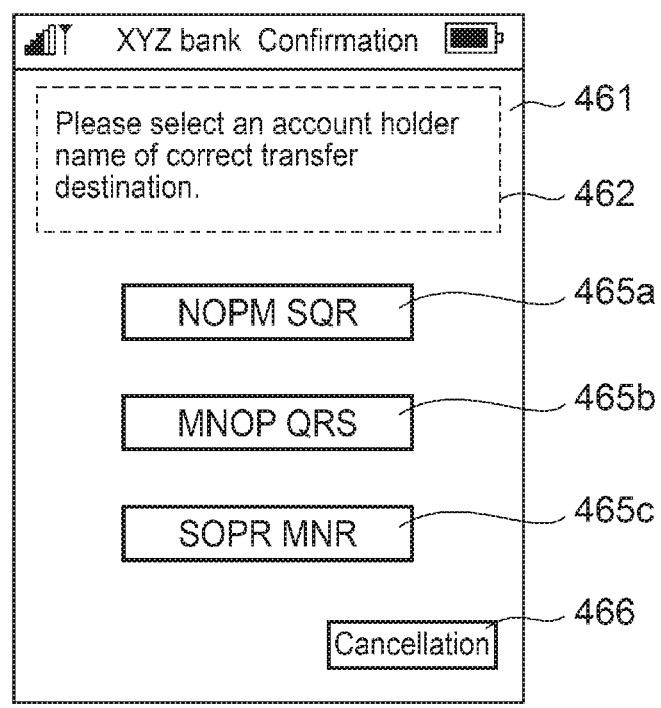
FIG. 17 is a display example of a confirmation form to be displayed on the second terminal according to an embodiment of the present disclosure.

In this way, when the notice is sent to the second terminal 161, a question (quiz) is presented to the user that is configured based on the details of transaction to be executed. FIG. 17 is a display example of the confirmation form displayed on the second terminal according to an embodiment of the present disclosure. Hereinafter, referring to FIG. 17, the description will be made.

In an example shown in FIG. 17, the question is displayed in the confirmation form 461 of the exclusive-use application. Furthermore, the notice is configured from HTML email and the confirmation form 461 may be displayed by a mailer and by accessing URL specified in the notice from the second terminal browser, the confirmation form 461 may be displayed.

A question of "please select the name of the correct registered holder of the transfer destination" is displayed on the message field 462 of the confirmation form 461. The option buttons 465a, 465b, and 465c and a cancellation button 466 are displayed. Below, assuming that the same transaction as in the above-mentioned embodiment is carried out, the description will be given.

That is, in this example, the name of the registered holder of the transfer destination in the transaction is "MNOP QRS" and this name is extracted as an option of the correct answer. Therefore, "MNOP QRS" as one option of the correct answer is shown as the answer by the option button 465b. When the user selects the option button 465b, the input by the user matches with the details of transaction. Therefore, in this case, the transaction is regarded as having been confirmed by the user and is executed.

On the other hand, the answer of the option button 465a is "NOPM SQR" and the option button 465c is "SOPR MNR". When the user selects the option button 465a or 465c, the input by the user contradicts the details of transaction. In this case, assuming that the user does not confirm the transaction content sufficiently, the transaction is not executed.

Furthermore, after the user chooses the option which contradicts the details of transaction, the retry may be permitted for the predetermined number of times, and the transaction may be cancelled at once.

The cancellation button 466 is used when the user notices that an unjust operation by a third party is being carried out or that there was an erroneous operation in the first terminal 121.

In the above embodiment, the hidden letters are used randomly to a part of the details of transaction. However, in the present embodiment, regarding a question (quiz) determined based on the details of transaction, the part of the details of transaction is selected randomly and the part may be inputted directly from the user or may be chosen from among options, in the same way. For example, the lower 4 digits of the account number (it is possible to change the position and the number of digits) may be directly inputted or chosen from among options.

Furthermore, because the answer can be identified based on the alphabet, the Kana character and the like when the object of a question is the registered holder of the transfer destination, it can be considered that the MITB attack and erroneous input are easy to discover, compared with a case of question of the account number and the transfer remittance. In this case, a possibility to be used as the transfer destination is low, but a dictionary of names, each of which consists of words and phrases which the user can read naturally is prepared previously, and the name may be randomly selected from the dictionary as an incorrect option to the question of the name of the registered holder of the transfer destination.

Furthermore, by operating of the option buttons 465a, 465b, and 465c by the exclusive-use application, the browser, or the mailer of the second terminal 161, the input can be given through the first terminal 161 not the input of the confirmation of the transaction. In this case, if a confirmation code is adopted, like the above-mentioned example, the input of the user becomes simple.

In the above-mentioned example, the second terminal 161 receiving a notice displays the following message on the screen with email and the like.

"Select a name of the registered holder of the transfer destination, and a confirmation code from the first terminal:
NOPM SQR (confirmation code 629)
MNOP QRS (confirmation code 254)
SOPR MNR (confirmation code 931)".

Figure 18:
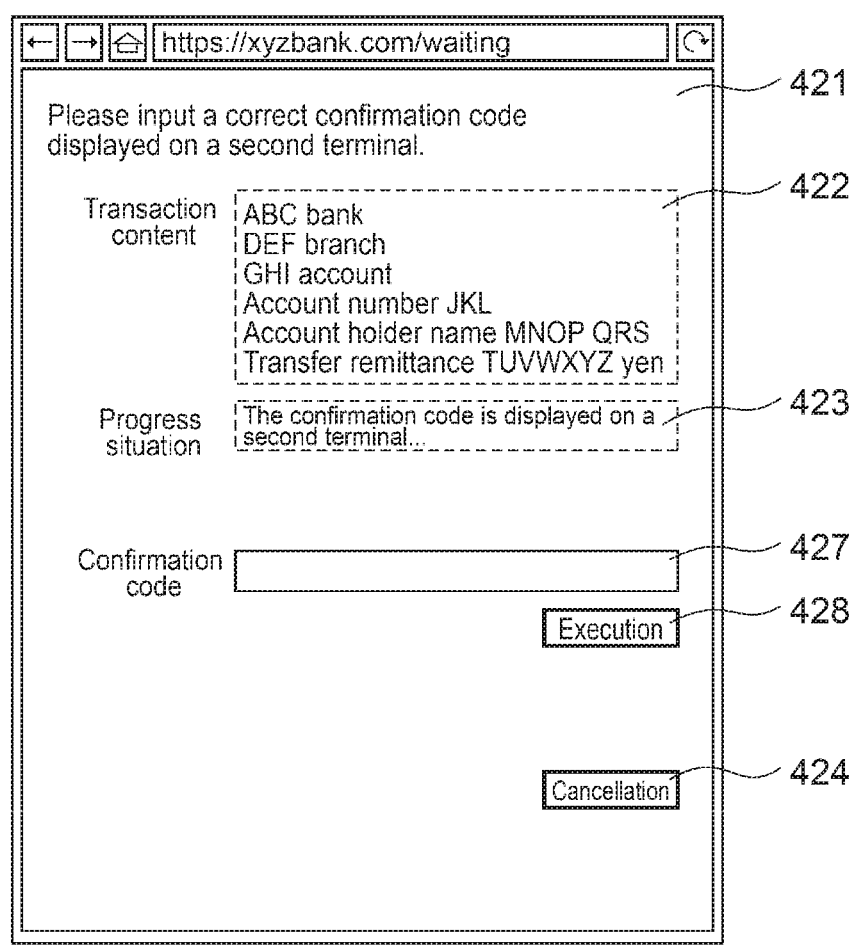
FIG. 18 is a display example of a stand-by form to be displayed on the first terminal according to an embodiment of the present disclosure.

FIG. 18 is a display example of the stand-by form displayed on the first terminal according to an embodiment of the present disclosure. In the example which is shown in FIG. 18, a code input field 427 to input the confirmation code and an execution button 428 are added to the stand-by form 421 shown in FIG. 6.

In this example, when the user inputs the confirmation code "254" to the code input field 427 and operates the execution button 428, the input by the user matches with the details of transaction.

Also, when the confirmation code other than the above code is inputted to code input field 427, the transaction is stopped, like a case of an operation of the cancellation button 424, because the input by the user contradicts the details of transaction. Furthermore, to cope with an erroneous input of the confirmation code, the retry may be permitted for the predetermined number of times.

In the present embodiment, the second authentication (211) in FIG. 2 may be omitted or can be simply carried out through the start-up of the exclusive-use application and the operation of the mailer. That is, in the present embodiment, it could be regarded as success of the second authentication (211) based on the second terminal 161 is held and set to an operable state. Then, instead of the display (212) of the whole transaction content, a question is presented to the user based on the details of transaction.

The user carries out the confirmation (213) by inputting an answer to the question. This confirmation (213) may be inputted through the second terminal 161 and sent to the server 121, as shown in FIG. 2, or inputted through the first terminal 141 and sent to the server 121 (not shown). At this time, a terminal possible to input may be limited and the input may be made from either. When the input from either is made possible, the confirmation code may be presented, for example, in the options 465a, 465b, and 465c.

Furthermore, it is possible to present the whole details of transaction as options. For example, it is sufficient to provide "ABC bank, DEF branch, GHI bank account, JKL account number, registered holder of transfer destination MNOP QRS, and TUVWXYZ yen" as a correct answer option, and to change to an option different from the above-mentioned correct answer option to have the following bank name, account number, transfer remittance, and account holder and the like as an incorrect answer option. For example, when a notice is carried out with an email, the following sentence can be adopted.

"Select the correct transaction content and input a confirmation code from the first terminal:
BCA bank, EFD branch, IHG bank account, KLJ, NOPM SQR, XYZTUVW yen (confirmation code 629)
ABC bank, DEF branch, GHI bank account, JKL, MNOP QRS, TUVWXYZ yen (confirmation code 254)
CAB bank, EDF branch, HIG bank account, LJK, SOPR MNR, VWXYZXY yen (confirmation code 931)"

Figure 19:
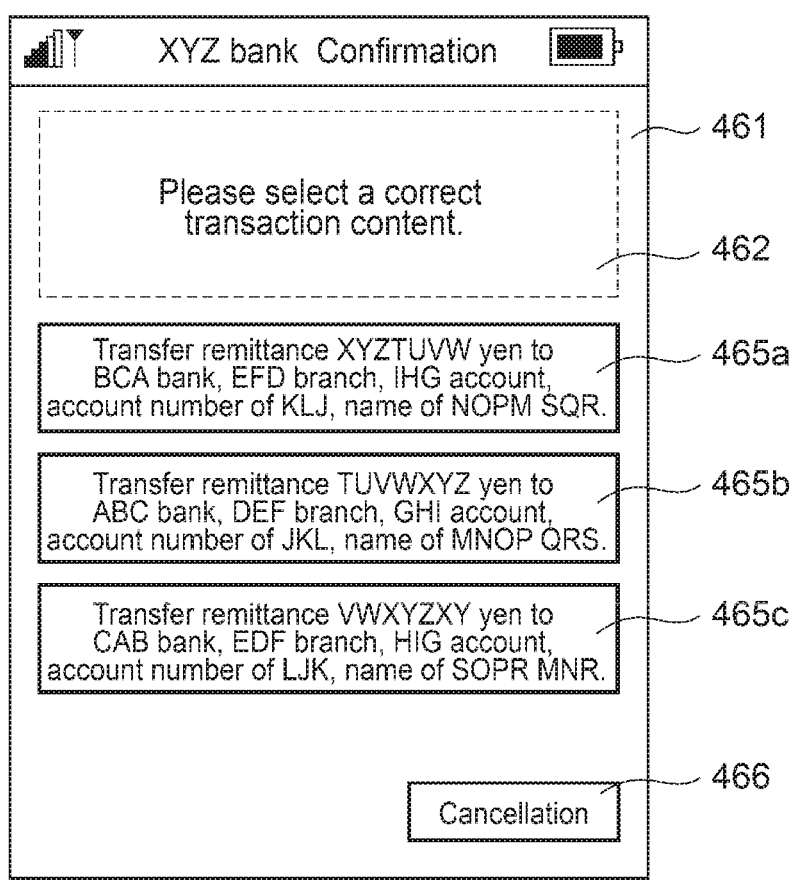
FIG. 19 is a display example of a confirmation form to be displayed on the second terminal according to an embodiment of the present disclosure.

In this example, an incorrect answer option is formed by randomly replacing letters contained in each item of the correct answer option. However, as mentioned above, each item may be formed by using the dictionary which was prepared previously. Also, the above-mentioned options are displayed by the option buttons 465a, 465b, and 465c of the exclusive-use application, for user to select. In this case, the confirmation code may be omitted. FIG. 19 is a display example of the confirmation form displayed on the second terminal according to an embodiment of the present disclosure. In FIG. 19, the transaction content of the above-mentioned transfer is displayed as options, and when the user selects the option button 465b of the correct answer, it is regarded as the confirmation of transaction.

Furthermore, a call is made to the second terminal 161 from the server 121 in automatic speech and the user may be informed of each message and the content of options by the sound. In this case, the user may select one of the options by using the dual-tone multi-frequency of the mobile phone, and the confirmation code transmitted by the automatic sound may be inputted from the first terminal 141.

The generation of these questions and options may be executed by the server 121 or by the second terminal 161 when the details of transaction are transmitted from the server 121 to the second terminal 161.

In the former example, the question messages and options containing the correct answer option and incorrect answer options are transmitted from the server to the second terminal 161. Then, information which identifies an option chosen by the user in the second terminal 161 is transmitted from the second terminal 161 to the server 121. The server 121 determines whether the user has confirmed the transaction based on whether the information sent from the second terminal 161 matches with the correct answer option.

In the latter example, the details of transaction is transmitted to the second terminal 161 and the question message and the options containing the correct answer option and the incorrect answer options are generated in the second terminal 161. Whether the option selected by the user is correct or incorrect is determined in the second terminal 161, and the information showing whether or not the user confirmed the transaction is transmitted to the server 121 from the second terminal 161 and the processing advances.

Furthermore, the number of options generated may be a predetermined number or be changed appropriately according to the situation.

Furthermore, when the first terminal 141 receives the MITB attack in the situation that the user is operating the first terminal 141, if the user notices an unjust use and operates the cancellation button 424 of the stand-by form 421, the user can stop the transaction and can inform all concerned parties.

However, when the third party logs in to the server 121 by the unjust access to execute a transaction, the user sometimes cannot operate the first terminal 141 directly.

In such a case, it is desirable to previously prepare the available cancellation button 466 in the second terminal 161 or a function which is equivalent to this. For example, when the user selects them using a link or a button of an HTML email, URL of a text email, a phone number button for dual-tone multi-frequency and the like which instruct a stop, the transaction in the first terminal 141 is stopped.

In this case, the user stops the transaction by operating the second terminal 161. Therefore, a message that the transaction has been stopped by an operation of the user is displayed in the second terminal 161.

However, there is a possibility that the third party carrying out an unjust use is operating the first terminal 141. Therefore, with a sentence of "complete transaction" and the like, it may be pretended to show as if the transaction completes successfully. In this case, the third party carrying out the unjust use falsely believes that the unjust transaction succeeded. On the other hand, the investigation subdivision of a bank can put on a blacklist the accounts relating to the unjust use and can buy time for sharing the information with other banks.

SUMMARY

As described above, a transaction system according to the above embodiment includes a server, a first terminal, and a second terminal, when receiving a transaction instruction through the first terminal from the user who logged in to the server through the first terminal, the server generates a notice to be transferred to the second terminal, when the notice is transferred to the second terminal from the server, the first terminal or the second terminal prompts to the user, an input to confirm the details of transaction, and when the input of the user to the first terminal or the second terminal and the details of transaction match, the server regards the confirmation of the transaction made by the user as having been carried out.

Also, in this transaction system, when the input of the user to the first terminal or the second terminal and the details of transaction contradict, the server can be configured to cancel the transaction made by the user.

Also, in this transaction system, when the notice is transferred to the second terminal from the server, the second terminal presents multiple options that contains a correct answer option that matches the details of transaction and an incorrect answer option that contradicts the details of transaction, the first terminal or the second terminal prompt the user to select any of the multiple options as the input, and when the option selected based on the input of the user is the correct answer option, the server regards the confirmation of the transaction made by the user as having been made.

Also, in this transaction system, the multiple options are related to different confirmation codes, each of the multiple options is presented to the user with the related confirmation code, the prompted input is for the confirmation code related to the option selected by the user, when the inputted confirmation code is the confirmation code related to the correct answer option, the server regards the confirmation of the transaction made by the user as having been made.

Also, in this transaction system, each of the multiple options and the confirmation code related to the option are presented to the user by sound through the second terminal.

Also, in this transaction system, the multiple options include a stop option, when the selected option is the stop option, the server cancels the transaction made by the user.

Also, in this transaction system, the input is made to the second terminal, and when the selected option is the stop option, the server reports the transaction that has been canceled, to an administrator.

Also, in this transaction system, the input is made to the second terminal, the selected option is the stop option, the server presents that the transaction has completed, through the first terminal to the user, and that the transaction is cancelled, through the second terminal to the user.

Also, in this transaction system, the correct answer option is generated by displaying the details of transaction.

Also, in this transaction system, the correct answer option is generated by extracting a part of the details of transaction.

Also, in this transaction system, the notice is transferred to the second terminal by transmitting the notice from the server to the second terminal by electric mail, the input of the user is made to the first terminal.

Also, in this transaction system, the notice is transferred from the server to the second terminal by the server pushing the notice to the second terminal.

Also, in this transaction system, the server generates a character string code, a one-dimensional code or a two-dimensional code as the notice, and presents the character string code, the one-dimensional code or the two-dimensional code through the first terminal to the user, the notice is transferred to the second terminal from the server by the second terminal capturing the character string code, the one-dimensional code or the two-dimensional code.

A transaction method according to the above embodiment is a transaction method executed by a transaction system including a server, a first terminal and a second terminal, when a transaction instruction is received from a user who logged-in to the server through the first terminal, the server generating a notice to be transferred to the second terminal;

when the notice is transferred from the server to the second terminal, the first terminal or the second terminal prompts an input to confirm the details of transaction to the user, when the input of the user to the first terminal or the second terminal and the details of transaction match, the server regards the confirmation of the transaction made by the user as having been made.

An information recording medium according to the above embodiments, a computer can be configured from a non-transitory information recording medium in which a program to make the computer function as the server is recorded.

An information recording medium according to the above embodiments, a computer can be configured from a non-transitory information recording medium where a program to make a computer function as the second terminal in the above-mentioned transaction system is recorded.

The present disclosure can be realized in various embodiments and modifications without deviating from the range and spirit of the wide sense of the present disclosure. Also, the above-mentioned embodiments are to explain the present disclosure and are not one which limits the scope of the present disclosure. That is, the scope of the present disclosure is shown by not embodiments but the claims. Various modifications carried out within the claims and the range of the meaning of the disclosure are regarded as being the inside of the scope of this disclosure.

This application is based on the international application PCT/JP2014/064757 that was filed in Japanese Patent Office as a receiving Office on Jun. 3, 2014 (Tuesday), and contained U.S.A. as a designated country. The present application incorporates the Description, Claims, and the whole set of drawings of the international application PCT/JP2014/064757 by reference.

INDUSTRIAL APPLICABILITY

The above embodiments can use only a part of an element and combine embodiments appropriately and those embodiments are also contained in the technical scope of the present disclosure.

According to the present disclosure, in a transaction system which a login operation is carried out on a server through a first terminal and a transaction instructed after the login operation is executed, a transaction system which improves security by using a second terminal, a transaction method by the transaction system, and an information recording medium in which a program is stored to realize the transaction system by a computer.

REFERENCE SIGNS LIST

101 Transaction system
121 Server
141 First terminal
161 Second terminal
181 Computer communication network
401 Login form
402 User name field
403 Password field
404 Login button
411 Transfer form
412 Bank name field
413 Branch name field
414 Bank account kind field
415 Bank account number field
416 Account holder name field
417 Transfer remittance field
418 Execution button
421 Stand-by form
422 Transaction content field
423 Progress situation field
424 Cancellation button
425 Acceptance button
427 Code input field
428 Execution button
431 Home screen
432 Notice
441 Authentication form
442 Password field
443 Authentication button
444 Message field
451 Cancellation form
452 Message field
453 Acceptance button
461 Confirmation form
462 Message field
463 Confirmation button
464 Option button
465a, 465b, 465c Option button
466 Cancellation button
471 Completion form
472 Record field
473 Acceptance button

The invention claimed is:

1. A servicing method executed by a server, comprising:
authenticating a user sending a login request to the server through a first terminal, receiving from the first terminal a transaction request of transfer remittance from the authenticated user to a destination account associated with destination account information which has been input by the authenticated user to the first terminal, determining randomly a portion of the transaction request, said portion containing a part of the destination account information,
generating a notice specifying details of the transaction request, said details represented by letters, with the determined portion hidden by replacing the determined portion with at least one symbol,
transmitting the generated notice to a second terminal in order for the second terminal to display a cancellation option and the details specified in the generated notice, accepting, from the first terminal, an answer that supplements the hidden portion,
determining whether the transaction request is confirmed by the authenticated user based on whether the accepted answer and the determined portion match with each other, cancelling the transaction request when the displayed cancellation option is selected in the second terminal, or the accepted answer and the determined portion contradict, and presenting, when the cancellation option is selected in the second terminal, a false end message through the first terminal, wherein the false end message incorrectly states that the transaction request completed successfully, and a true end message through the second terminal, wherein the true end message correctly states that the transaction request is cancelled.

2. A non-transitory information recording medium storing a program to cause a computer to:
authenticate a user sending a login request to the server through a first terminal,
receive details of a transaction request through a first terminal from the authenticated user through the first terminal,
generate a notice specifying details of the transaction, said details represented by letters, with a portion of the received details hidden by replacing each letter of the portion with at least one symbol,
transmit the generated notice to a second terminal in order for the second terminal to display the details specified in the generated notice,
accept, from the first terminal, an answer that supplements the hidden portion, determine whether the transaction request is confirmed by the authenticated user based on whether the accepted answer and the hidden portion of the received details match with each other, cancelling the transaction request when the displayed cancellation option is selected in the second terminal, or the accepted answer and the determined portion contradict, and presenting, when the cancellation option is selected in the second terminal, a false end message through the first terminal, wherein the false end message incorrectly states that the transaction request completed successfully, and a true end message through the second terminal, wherein the true end message correctly states that the transaction request is cancelled.

3. A transaction system comprising a server, a first terminal, and a second terminal, wherein the server authenticates a user sending a login request to the server through the first terminal,
the first terminal obtains destination account information which is input by the authenticated user to the first terminal, and sends a transaction request of transfer remittance from the authenticated user to a destination account associated with the obtained destination information,
the server receives the transaction request from the first terminal, determines randomly a portion of the transaction request, said portion containing at least one part of the destination account information, generates a notice specifying details of the transaction request, said details comprising letters, with said determined portion hidden by replacing said determined portion with at least one symbol, and transmits the generated notice to the second terminal,
the second terminal receives the transmitted notice from the server, and displays, on a second screen of the second terminal, a cancellation option and the details specified in the received notice,
the first terminal prompts the authenticated user to compare the destination account information which is input by the authenticated user to the first terminal with the displayed details on the second screen, and input to the first terminal, an answer that supplements the hidden portion in the displayed details, and
the server accepts the input answer from the first terminal, and determines whether the transaction request is confirmed by the authenticated user based on whether the accepted answer and the determined portion match each other, and
wherein the server cancels the transaction request when the displayed cancellation option is selected in the second terminal, or the accepted answer and the determined portion contradict,
and wherein, when the cancellation option is selected in the second terminal, the server presents a false end message through the first terminal, wherein the false end message incorrectly states that the transaction request completed successfully, and presents a true end message through the second terminal, wherein the true end message correctly states that the transaction request is cancelled.

4. The transaction system according to claim 3,
wherein the server generates multiple answers including a correct answer that matches with the determined portion, and at least one incorrect answer that contradicts the determined portion, generates respective confirmation codes related to the multiple answers, and includes the generated multiple answers and respective confirmation codes into the generated notice,
wherein the second terminal displays a message containing the multiple answers and respective confirmation codes included in the received notice,
wherein the first terminal prompts the user to input, to the first terminal, any of the respective confirmation codes displayed on the second screen, and
wherein when the input confirmation code as the input answer by the user to the first terminal is related to the correct answer, the server determines that the request is confirmed by the authenticated user.

5. The transaction system according to claim 3, wherein when the cancellation option is selected in the second terminal, the server notifies an administrator of the cancelled transaction request in order to put an unjust destination account contained in the cancelled transaction request into a blacklist.

6. The transaction system according to claim 3, wherein the server transmits the notice to the second terminal by e-mail.

7. The transaction system according to claim 3, wherein the server pushes the notice to the second terminal.

8. A transaction system comprising a server, a first terminal, and a second terminal, wherein the server authenticates a user sending a login request to the server through the first terminal, the first terminal obtains destination account information which is input by the authenticated user to the first terminal, and sends a transaction request of transfer remittance from the authenticated user to a destination account associated with the obtained destination information,
the server receives the transaction request from the first terminal, generates multiple answers including a correct answer that matches with the destination account information in the received transaction request and incorrect answers, each of which contradicts the received transaction request, generates respective confirmation codes related to the multiple answers, generates a notice specifying the generated multiple answers and respective confirmation, and transmits the generated notice to the second terminal, the second terminal receives the transmitted notice from the server, and displays a cancellation option and a message containing the multiple answers and respective confirmation codes specified in the received notice, the first terminal prompts the authenticated user to compare the destination account information which is input by the authenticated user to the first terminal with the displayed message on the second screen, and input, to the first terminal, an answer code among the displayed confirmation codes, and the server accepts the input answer code from the first terminal, and determines whether the transaction request is confirmed by the authenticated user based on whether the accepted answer code is related to the correct answer or not, and wherein the server cancels the transaction request when the displayed cancellation option is selected in the second terminal, or the accepted answer and the determined portion contradict, and wherein, when the cancellation option is selected in the second terminal, the server presents a false end message through the first terminal, wherein the false end message incorrectly states that the transaction request completed successfully, and presents a true end message through the second terminal, wherein the true end message correctly states that the transaction request is cancelled.

9. The transaction system according to any one of claim 3 or 8, wherein through a browser program running in the first terminal, the user sends the login request, inputs the destination account information, and inputs the answer, and wherein the server ciphers the notice with an encryption key associated with the second terminal, generates a character string code, a one-dimensional code, or a two-dimensional code associated with the ciphered notice, and presents the generated code to the user through a first screen of the first terminal through the browser program running in the first terminal, and wherein the second terminal captures the presented code from the first screen, deciphers the notice from the captured code with a decryption key associated with the second terminal, and whereby a Man In The Browser (MITB) program running in the browser program cannot decipher the notice.

10. The transaction system according to any one of claim 4 or 8, wherein each of the incorrect answers is formed by randomly replacing letters in the correct answer.

11. The transaction system according to claim 10, wherein the respective confirmation codes are configured from a predefined set of letters which are easier to input to the first terminal than the multiple answers.

12. The transaction system according to claim 3 or 8, wherein; when an application is started up in the second terminal, the application accesses the server to notify the server that the application is running in the second terminal, and the authentication of the user by the server requires fully that the application is running in the second terminal, and wherein the notice is transmitted from the server to the application running in the terminal and received by the application running in the second terminal, the details specified in the received notice are displayed on the second screen of the second terminal by the application running in the second terminal.

13. The transaction system according to claim 12, wherein the user inputs, to the first terminal, a fixed data as a login password to be specified in the login request, and the server authenticates the user with the login password specified in the login request.

14. The transaction system according to claim 12, wherein when the server is accessed from the application running in the second terminal, the server transmits a random table to the application running in the second terminal, the user inputs, to the first terminal, an extracted content of cells from the transmitted random table based on an extraction rule assigned to the user as a login password to be specified in the login request, and the server authenticates the user with the login password specified in the login request.

* * * * *